US012619674B2

(12) United States Patent
Williams et al.

(10) Patent No.: US 12,619,674 B2
(45) Date of Patent: *May 5, 2026

(54) SYSTEM AND METHOD FOR TOPOLOGICAL REPRESENTATION OF COMMENTARY

(71) Applicant: Intelling Media Corp., San Carlos, CA (US)

(72) Inventors: Peter Robert Williams, Belmont, CA (US); Scott Lester Minneman, San Francisco, CA (US); Stephan John Fitch, Woodside, CA (US)

(73) Assignee: INTELLING MEDIA CORP., San Carlos, CA (US)

( * ) Notice: Subject to any disclaimer, the term of this patent is extended or adjusted under 35 U.S.C. 154(b) by 62 days.

This patent is subject to a terminal disclaimer.

(21) Appl. No.: 18/507,643

(22) Filed: Nov. 13, 2023

(65) Prior Publication Data

US 2024/0078278 A1      Mar. 7, 2024

Related U.S. Application Data

(63) Continuation of application No. 18/047,813, filed on Oct. 19, 2022, now Pat. No. 11,841,914.

(60) Provisional application No. 63/257,360, filed on Oct. 19, 2021.

(51) Int. Cl.
*G06F 40/40* (2020.01)
*G06F 16/954* (2019.01)
*G06F 40/169* (2020.01)
(52) U.S. Cl.
CPC ............ *G06F 16/954* (2019.01); *G06F 40/40* (2020.01)

(58) Field of Classification Search
None
See application file for complete search history.

(56) References Cited

U.S. PATENT DOCUMENTS 9,483,580 B2 * 11/2016 Franceschini ....... G06F 16/9024
9,715,495 B1 * 7/2017 Tacchi ................... G06F 40/30
9,836,183 B1 12/2017 Love et al.
(Continued)

OTHER PUBLICATIONS

International Search Report and Written Opinion, issued Jan. 31, 2023, in corresponding PCT Application No. PCT/US2022/078362.
(Continued)

*Primary Examiner* — Ariel Mercado-Vargas
(74) *Attorney, Agent, or Firm* — Venable LLP; Ryan T. Ward

(57) ABSTRACT

Systems, methods, and computer-readable storage media for aggregating media (and commentary on that media) into a topology. To do so, the system receives first content (and associated metadata) as well as second content (and associated metadata). The system then generates a topology based on a relationship between the first content and the second content, where the topology has a number of dimensions based on the metadata of the different pieces of content. The system then compares the topology and the metadata to previously stored topologies and/or metadata and, based on that comparison, executes a machine learning algorithm. The output of that machine learning algorithm includes predicted future changes to the topology, which the system uses to reduce the number of dimensions within the topology.

20 Claims, 14 Drawing Sheets

(56) References Cited

U.S. PATENT DOCUMENTS

| | | | | |
|---|---|---|---|---|
| 9,852,132 | B2 * | 12/2017 | Chhichhia | G06F 16/9535 |
| 10,510,018 | B2 * | 12/2019 | Flinn | G06F 40/216 |
| 10,579,734 | B2 | 3/2020 | Assa | |
| 10,754,867 | B2 | 8/2020 | Ragavan et al. | |
| 11,250,030 | B2 * | 2/2022 | Wei | G06N 20/00 |
| 2009/0248399 | A1 | 10/2009 | Au | |
| 2013/0204885 | A1 * | 8/2013 | Clinchant | G06F 16/355 |
| | | | | 707/E17.073 |
| 2016/0042053 | A1 | 2/2016 | De Sousa Webber | |
| 2018/0039620 | A1 | 2/2018 | Ciulla et al. | |
| 2018/0173699 | A1 | 6/2018 | Tacchi et al. | |
| 2018/0267961 | A1 * | 9/2018 | Yamagami | G06F 40/30 |
| 2019/0108664 | A1 | 4/2019 | Cardno | |
| 2020/0349452 | A1 | 11/2020 | Ragavan et al. | |
| 2021/0224858 | A1 * | 7/2021 | Khoury | G06Q 30/0276 |
| 2021/0319187 | A1 | 10/2021 | Ito et al. | |
| 2021/0383070 | A1 | 12/2021 | Hunter | |
| 2022/0068153 | A1 * | 3/2022 | Harlow | G06F 40/30 |

OTHER PUBLICATIONS

U.S. Office Action issued May 24, 2023 in corresponding U.S. Appl. No. 18/047,813 [Available in IFW].
Notice of Allowance and Fees Due issued Jul. 19, 2023 in corresponding U.S. Appl. No. 18/047,813 [Available in IFW].

* cited by examiner

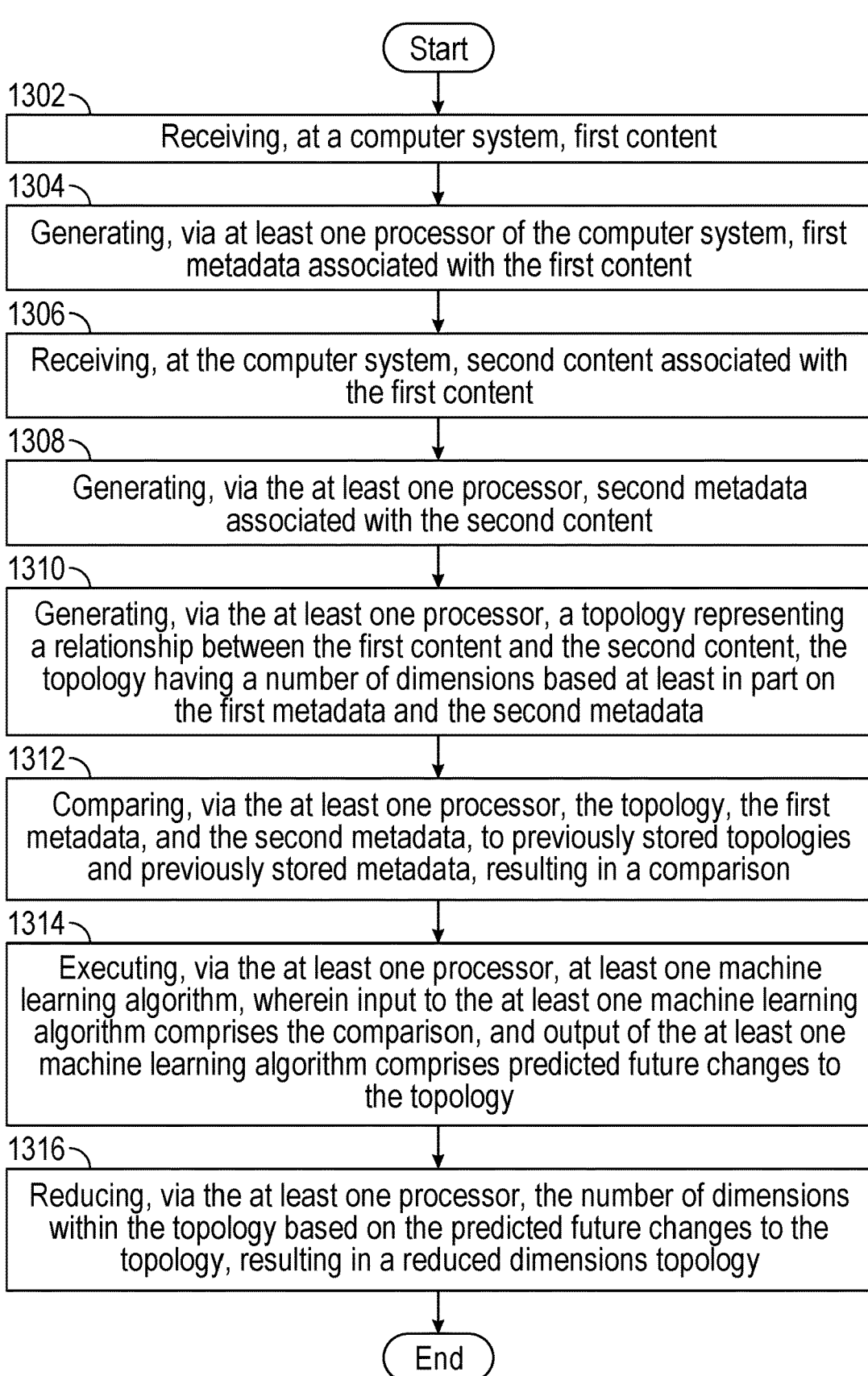

Start

1302 —

Receiving, at a computer system, first content

1304 —

Generating, via at least one processor of the computer system, first metadata associated with the first content

1306 —

Receiving, at the computer system, second content associated with the first content

1308 —

Generating, via the at least one processor, second metadata associated with the second content

1310 —

Generating, via the at least one processor, a topology representing a relationship between the first content and the second content, the topology having a number of dimensions based at least in part on the first metadata and the second metadata

1312 —

Comparing, via the at least one processor, the topology, the first metadata, and the second metadata, to previously stored topologies and previously stored metadata, resulting in a comparison

1314 —

Executing, via the at least one processor, at least one machine learning algorithm, wherein input to the at least one machine learning algorithm comprises the comparison, and output of the at least one machine learning algorithm comprises predicted future changes to the topology

1316 —

Reducing, via the at least one processor, the number of dimensions within the topology based on the predicted future changes to the topology, resulting in a reduced dimensions topology End

FIG. 13

SYSTEM AND METHOD FOR TOPOLOGICAL REPRESENTATION OF COMMENTARY

CROSS-REFERENCE

The present is a continuation of U.S. patent application Ser. No. 18/047,813, filed on Oct. 19, 2022, which claims priority to U.S. Provisional Patent Application No. 63/257, 360, filed Oct. 19, 2021, now U.S. Pat. No. 11,841,914, the contents of which are incorporated herein by reference in their entirety.

BACKGROUND

1. Technical Field

The present disclosure relates to a topological representation of commentary, and more specifically to aggregating media and commentary on that media into a topology.

2. Introduction

Online content distribution systems typically have a piece of content for a user to view, along with user created comments about the content. For example, a newspaper may have an article with a number of comments from users, just as a video on a system such as YOUTUBE may have a number of comments from users. Such systems may also give users the ability to comment on the comments of other users. However, filtering through the many comments to find additional information about a given topic, removing non-related information, ignoring the "crazies," and/or selecting only the top tier comments can quickly become computationally impossible for a human being to do, much less do so with an objective sense of quality.

SUMMARY

Additional features and advantages of the disclosure will be set forth in the description that follows, and in part will be understood from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media which provide a technical solution to the technical problem described. A method for performing the concepts disclosed herein can include: receiving, at a computer system, first content; generating, via at least one processor of the computer system, first metadata associated with the first content; receiving, at the computer system, second content associated with the first content; generating, via the at least one processor, second metadata associated with the second content; generating, via the at least one processor, a topology representing a relationship between the first content and the second content, the topology having a number of dimensions based at least in part on the first metadata and the second metadata; comparing, via the at least one processor, the topology, the first metadata, and the second metadata, to previously instantiated topologies and previously instantiated metadata, resulting in a comparison; executing, via the at least one processor, at least one machine learning algorithm, wherein input to the at least one machine learning algorithm comprises the comparison, and output of the at least one machine learning algorithm comprises predicted changes to the topology; and reducing, via the at least one processor, the number of dimensions within the topology based on the predicted changes to the topology, resulting in a reduced dimensions topology.

A system configured to perform the concepts disclosed herein can include: at least one processor; and a non-transitory computer-readable storage medium having instructions stored which, when executed by the at least one processor, cause the at least one processor to perform operations comprising: receiving first content; generating first metadata associated with the first content; receiving second content associated with the first content; generating second metadata associated with the second content; generating a topology representing a relationship between the first content and the second content, the topology having a number of dimensions based at least in part on the first metadata and the second metadata; comparing the topology, the first metadata, and the second metadata, to previously instantiated topologies and previously instantiated metadata, resulting in a comparison; executing a machine learning algorithm, wherein input to the machine learning algorithm comprises the comparison, and output of the machine learning algorithm comprises predicted changes to the topology; and reducing the number of dimensions within the topology based on the predicted changes to the topology, resulting in a reduced dimensions topology.

A non-transitory computer-readable storage medium configured as disclosed herein can have instructions stored which, when executed by a computing device, cause the computing device to perform operations which include: receiving first content; generating first metadata associated with the first content; receiving second content associated with the first content; generating second metadata associated with the second content; generating a topology representing a relationship between the first content and the second content, the topology having a number of dimensions based at least in part on the first metadata and the second metadata; comparing the topology, the first metadata, and the second metadata, to previously instantiated topologies and previously instantiated metadata, resulting in a comparison; executing a machine learning algorithm, wherein input to the machine learning algorithm comprises the comparison, and output of the machine learning algorithm comprises predicted changes to the topology; and reducing the number of dimensions within the topology based on the predicted changes to the topology, resulting in a reduced dimensions topology.

BRIEF DESCRIPTION OF THE DRAWINGS

FIG. 13 illustrates an exemplary method embodiment; and

DETAILED DESCRIPTION

Figure 1:
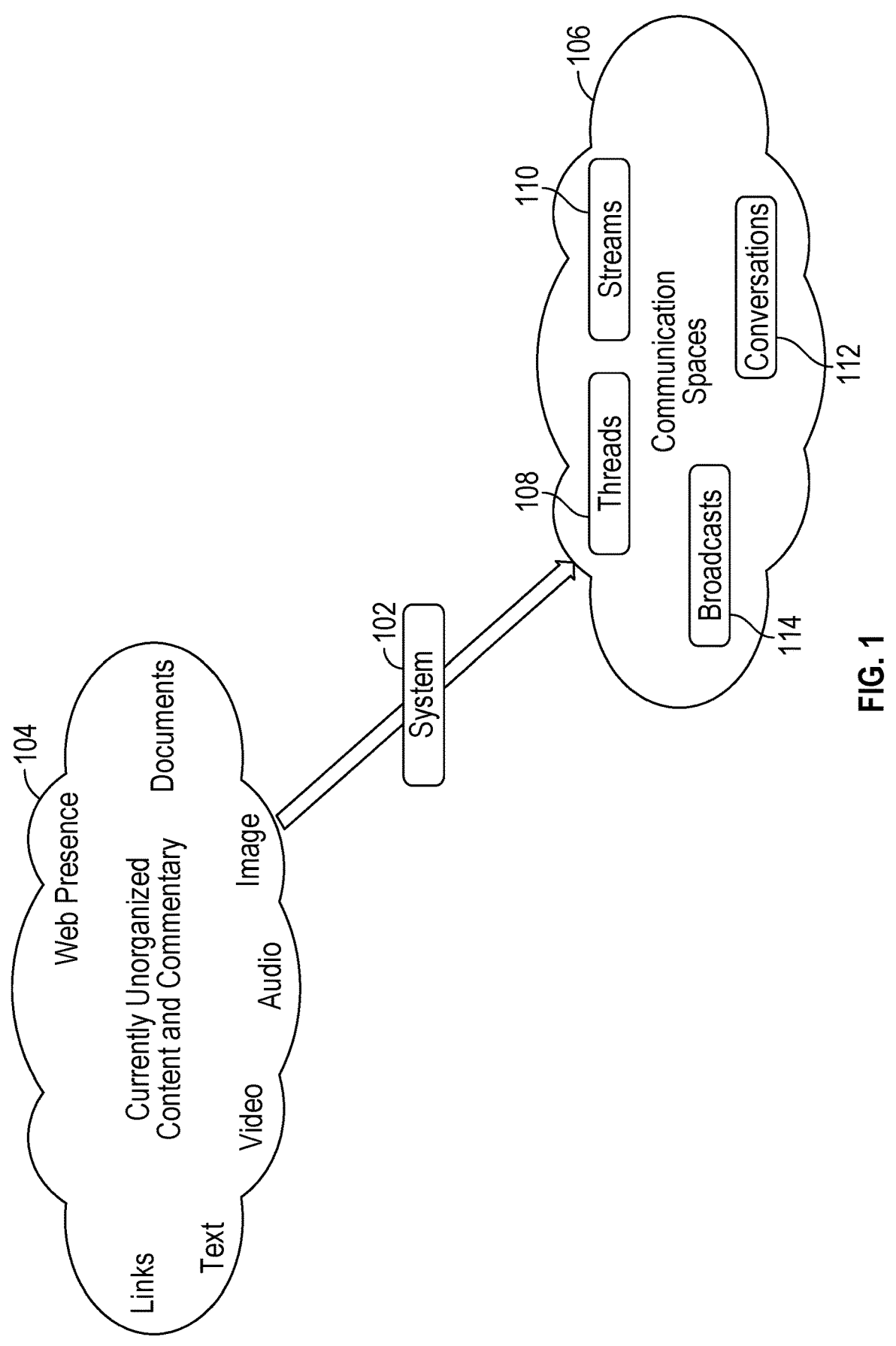
FIG. 1 illustrates an example of inchoate sources formed into communication spaces.

Various embodiments of the disclosure are described in detail below. While specific implementations are described, this is done for illustration purposes only. Other components and configurations may be used without parting from the spirit and scope of the disclosure.

Systems configured as disclosed herein generate a new form of community-generated content. This new, community-generated content is organized in a manner which can provide faster, more efficient navigation of content, while also providing the ability for users to view content which is specifically tailored for their needs and/or background.

To do this, the system can integrate community-generated content with commentary on that content, resulting in the new media form. The new media form can have different types of contributions from a number of users. This new, multi-contribution type media can capture the distributed expertise of the crowd, and can provide that distributed expertise to subsequent consumers. The subsequent consumers can then further refine both what they see and what others see based on how they interact with the integrated media type.

For example, the system can modify what content is presented to the user based on their viewing pattern, consumption pattern, if/how the user adds further commentary, if/how the user adds additional content, if/how the user generates references to the content viewed, and/or if the user embeds the content within other content. Likewise, the system can modify how another user views the content based on the interaction behaviors of the first user. This can also apply to groups of users, where the interaction behaviors of one or more people can result in the system modifying how other users will see subsequent content. The result is a system which effectively removes the noise from media by providing a much more succinct set of dimensions reflective of the commentary. This reduces the reducing information complexity, allowing computer to more efficiently identify what is valuable in the comments and provide navigation to user.

The system can include a set of system elements that operate to create a community-inclusive interactive content rendering and management system. While some of the functions of the system are available in otherwise-available media consumption ecosystems (e.g., YOUTUBE), those other systems create a fragmented and confusing user experience for those who are trying to make sense of a discourse, domain, topic, event and/or the like.

Systems configured as described herein support effective integration of content and commentary in a manner that enables discovery and discourse on this content and commentary through a framework where the authors of both content and commentary can, at least in part, present a discourse as a coherent navigable context.

The combination of content and commentary on that content represents a form of conversation. This conversation can involve multiple parties, with multiple content elements, multiple comments, and multiple perspectives. Conversations received by the system can be collectively aggregated together (including information about the content, the comments on the content, and the various entities responsible for both content and comments), and can collectively form a communication space. This communication space can be represented by one or more topologies. A topology, as defined herein, is a set of information with a defined structure, where the set of information allows for defining of subspaces and subspace deformations. Such a space can be analyzed by multiple techniques including, for example: geometric reasoning, space analytics (for example Hilbert spaces, Reiman and other manifold techniques), probabilistic techniques (including machine learning and artificial intelligence), and the like.

Using as least one of these techniques, relationships between the entities within a communication space (i.e., those who have provided content, including those who provided content in the form of comments on other content) can be established and provided to a user as a "projection." A projection enables the system to identify subsets of the topology and provide ("project") those subsets to the user. For example, consider a user generating a query to the system for topics related to "apple pie." The system can identify, within the communication space, subsets related directly to apple pie, as well as subsets related to apples and pie. In some configurations, the system could identify additional subsets, such as fruit, desserts, and baked goods. The system can then provide one or more of these subsets to the user in response to the query. At that point the user can manipulate, engage, and/or otherwise interact with these subsets of the communication space. For example, the user can add their own recipe for apple pie, the user can comment on a picture someone else posted of apple pie, and/or a user can choose to navigate further into one or more of those related topics (e.g., fruit).

The communication space may be navigated, explored, and evaluated by users to undertake sensemaking of the plethora of information that may include a communication space. This sensemaking may be on a personal or group level. In some circumstances there may be a commonly adopted sensemaking, where in aggregate a group of people have agreed that a certain projection, for example a subset, of the communications space provides a sensemaking perspective that is shared by that group.

FIG. 1 illustrates an example of unorganized content and commentary 104 (including content such as web pages, documents, images, audio, video text and/or links) which, when processed by the systems 102 described herein, form an organized and tractable set of communication spaces 106 supporting exploration and navigation. Exemplary subsets within the communication space 106 can include threads 108 (e.g., multiple posts by a single author on a common subject, where each post can be viewed individually, but when combined together may provide additional context or information), streams 110, broadcasts 114, and/or conversations 112 (e.g., communications between one or more individuals, where subsequent communications depend upon a previous communication).

Types of Content

Any form of content may be captured and rendered, subject only to the capabilities of the capture and render devices and/or services. Content types can include, for example, video, audio, text, images, links, icons, tokens, references, and the like, in any arrangement. Further content and commentary types may include information from sensors and wearables, such as eye gaze, gait, face, hand or limb movements, heart rate variability, and/or other biometrics, as well as environmental, locational, temporal sensing (such as temperature, humidity, mass), radio frequency detectors, and the like.

Content may include material that has been previously published or is being generated in real time (e.g., VIMEO, YOUTUBE, TIKTOK, podcasts, video conferences, performances, lectures, theatre, musical events, webinars, live television, live radio, and/or other real time events and communications.

Each of these pieces of content can have a set of attributes, including the identity of the author, the identity of the publisher, the type of content (such as video, audio, etc.), the content format type (e.g., type of video or audio encoding, type of image, etc.), temporal information (time of creation, publication, distribution, time at location(s), duration, etc.), location data (e.g., GPS (Global Positioning System) location, general location (such as city, state, and/or country), etc., and any other metadata.

Comments can also be considered as content, and may include other content and/or comments through reference or embedding. In some embodiments, where an individual content element and/or comment can be identified as unique, there can be one or more processes that act to ensure that duplicates are identified as such, so that any recursion is minimized or avoided. Content may be incorporated into the system by embedding or reference. This can include any form of material that can be rendered. In one example, a video can be content and a comment on that video can be considered metadata; if another comment were made to the first comment, in that situation the first comment would be "content" and the second comment would be "metadata." In another example, a comment may be related to more than one piece of content, and therefore be metadata to more than one piece of content.

The attributes of the content may be bound to the content. For example, the attributes can be a form of metadata and may be extracted, calculated, and/or inferred by the system. For example, the size, bit rate, codec, source, identity, location, timing, and/or other attributes of the content may be retrieved from the metadata. In some embodiments, fingerprinting may be used to establish the uniqueness of content and/or commentary, as may rights management, tokenization, and other forms of encryption and digital identification.

Figure 2:
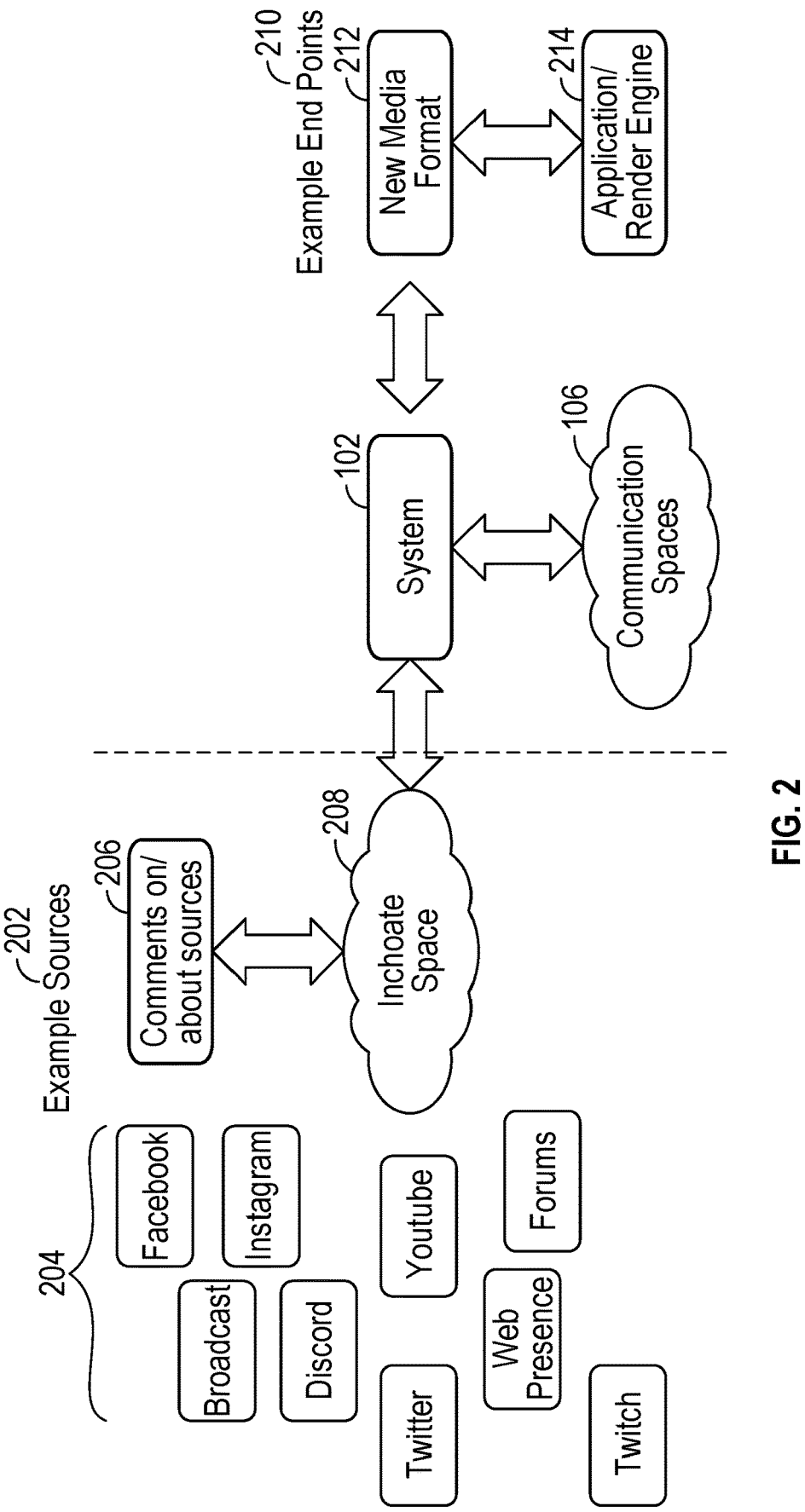
FIG. 2 illustrates an example of sources and a new media endpoint.

FIG. 2 illustrates an example of the sources 202 forming an inchoate (not fully developed) space 208, where each of the sources 204 contain content and often commentary 206 which is directed at and/or associated at those sources 204. The system 102 can process the inchoate space 208, forming organized communication spaces 106 which can be arranged by the system 102 into endpoints 210 such as a new media format 212, where the new media format 212 can be explored and navigated via an application/rendering engine 214.

Types of Commentary

Commentary may involve differing types of media, which includes any media type that can be recorded and rendered. For example, commentary may include links, other content, visual response, audio response, text, images, icons emojis, scalars (such as likes, thumbs up/down, five stars and the like) and any other form of response in any arrangement. Commentary may be expressed directly, such as text, video or other images (e.g., emojis or GIFs), and the like. Indirect commentary can also be made, such as making no comments, physical reactions (captured, for example, by cameras, wearables, and/or sensors (including biometric sensors)), skipping or fast forwarding through some content, or other expressive responses to content or commentary.

Unlike systems where content and comments on content are each separately identified as such and each has a defined set of attributes associated with it (e.g., metadata), system configured as described herein do not require such separation. Instead, each comment, set of comments, comments on comments and/or references, including links to comments, can be treated as content, which can then be stored, managed, and accessed using one or more well-known data retrieval and management techniques.

The system operates to prevent recursions, such as where a comment leads to further comments and in doing so provides a circular path back to the original comment. By using topologies for the content and the comments, the system can establish multiple dimension relationships between content, comments, and comments on comments, that are each represented in multidimensional frameworks. In this manner, a recursion can be identified and tagged as such, and if necessary removed in any projection or other results from the topology. In some cases there may be reason to keep a record of such recursions when, for example tracking self-supporting arguments, false information, and/or disinformation sets and the like. These topologies may support management and retrieval options that support investigation of trends, clusters, intensity, diversity (of comments), focus, and other aspects leading to contextualization of such comments.

In some cases, the system can analyze comments to determine how those comments are likely to influence/impact other broader contexts such as rules, laws, and/or other societal aspects. For example, the system can analyze audio and/or video to identify features of comments—such as frequency of specific words or phrases, volume of those words or phrases, specific expressions, verbosity, icons, and the like. Based on that information, the system can flag, or otherwise make users aware of the likely impact those comments will have.

In some configurations, topologies can be updated or modified by having the author of the original, initial piece of content agreeing with, disagreeing with, authorizing, not authorizing, or otherwise interacting with commentary on their original content. For example, a user may want to see aspects of a topology where the author disagrees with the comments (e.g., where the user is seeking contrary opinions). In such configurations, commentary may be authorized, not authorized, or null authorized. Authorized content has at least a notation bound to that commentary representing the original authors' agreement with the commentary. Non-authorized commentary is that which the author is not in agreement with. Null authorization represents the author having no expressed position in relation to the commentary. Authorizations may be expressed on a continuum, from authorized through null to not authorized, representing the relative degree to which the original author agrees, supports or aligns with the perspective expressed in the commentary. This mechanism can be applied recursively, allowing commentors to further refine the underlying representation by agreeing or disagreeing with comments on their comments that embeds a more complete argumentation structure within the topology.

In the case where the commentary includes further content, for example linear video, image, audio, and/or text, the relationship of this content with the original, as determined by the author of the original content may be expressed as a scalar on at least one dimension, where the dimension may consist of a range of perspectives. For example, the dimension can consist of an expression and its opposite (e.g., consistent or orthogonal, agree or disagree, supporting or non-supporting). Each of these dimensions can be declared, as can the scalars associated with them, which for example can be linear, logarithmic, exponential, and the like. Each dimension and scalar can be made available to any audience, ranging from just the original content author to anybody.

Those dimensions can be configured manually and/or algorithmically composed by the system, authors, users and/or commentators. In some embodiments dimensions and scalars can be computationally derived in any arrangement. For example, dimensions and scalars in one communication space and/or in one conversation may be compared and integrated into a second communication space, which can include one or more conversations and the feature sets, dimensions and scalars thereof. This can be instantiated as an integrated topology, including such dimensions and scalars which may be processed by one or more system functions, including navigation and exploration tools to create a further communication space and/or conversation set that is derived from the original input content and commentary.

As dimensions and scalars can consist of any set of terms, for example, computational linguistics and similar textual analytic techniques may be used to cluster and associate these dimensions into groups with similar linguistic attributes, as meta dimensions and scalars.

Within the content and commentary there may be features and sets thereof which, using at least one feature extraction techniques described herein, may form structures and/or arrangements that support exploration, navigation, clustering, supporting a user, and group or system operation. These features and sets may be configured manually or through an automated process. For example, using machine learning feature detection, the system can create instances of appropriate structures (graphs/taxonomy/classifiers, etc.) and can provide a user with navigation tools which allow selection of a representation type (e.g., cluster, list, hierarchy, etc.) by the user.

In some embodiments, behaviors of the audience in response to content may be incorporated as commentary. For example, in a video conference, responses of participants to another participant (e.g., a speaker, presenter and the like) may be analyzed and presented as commentary. As another example, if the audience has a negative response to a specific event in a presentation, where that response includes visual, audio, links, references, or other responses, the response may be tracked and processed as commentary.

One aspect of commentary is the relationship of the commentator to the content and the commentary. For example, it may be informative to understand whether the commentator has consumed the content on which they are commenting, and whether this was in whole or in part. Other aspects may be, subject to such information being or becoming available, the relationship of a commentator to content, for example: Do the content provider and the commentator work for the same organization? Is the commentator sponsored or in other ways incented to make a specific type of content? Does the commentator have a history of making comments of a particular type (such as always negative or positive)? Does the commentator have a self-expressed and/or verifiable expertise in the domain on which they are commentating?

In some cases not all this information may be available, and in some cases the information may be intentionally hidden or obscured. For example, an industry funded person making positive or negative comments on content pertaining to that industry may not want their information made public. In addition, this information can be intentionally hidden by system administrators to prevent other commentators from falsely presenting other's perspective.

To provide information regarding the relationship between commentator and content, the system may create and manage at least one metric representing the relationship (s) that a commentator can have with content/commentary, where the values of the metric(s) are based on the information available. In some embodiments, this information may become available after the time at which the comment was made, and upon becoming available may then form part of the new media type. For example, if a commentator (who already has made multiple comments) becomes known for a relationship with a sponsor, promoter of a product, an ideology, a dogma or other perspective, etc., such information may be conveyed in the relationship metrics of the previously made commentary and/or content.

In some embodiments, the system may be directed, either though algorithmic or external direction and configuration, to gather information pertaining to content and/or commentary and their respective authors. For example, this information may be acquired from established distribution channels, such as LINKEDIN, FACEBOOK, TWITTER, MARTINDALE, and the like. This information may then be integrated into the new media type, providing further informing aspects as to the relationships of these entities. This information may also be tagged as coming from one or more specific sources or source types, and in some embodiments may have one or more further metrics that express, at least in part, estimates of authenticity, reliability and/or verifiability of such information. This may be expressed in the form of a confidence metric.

Figure 3:
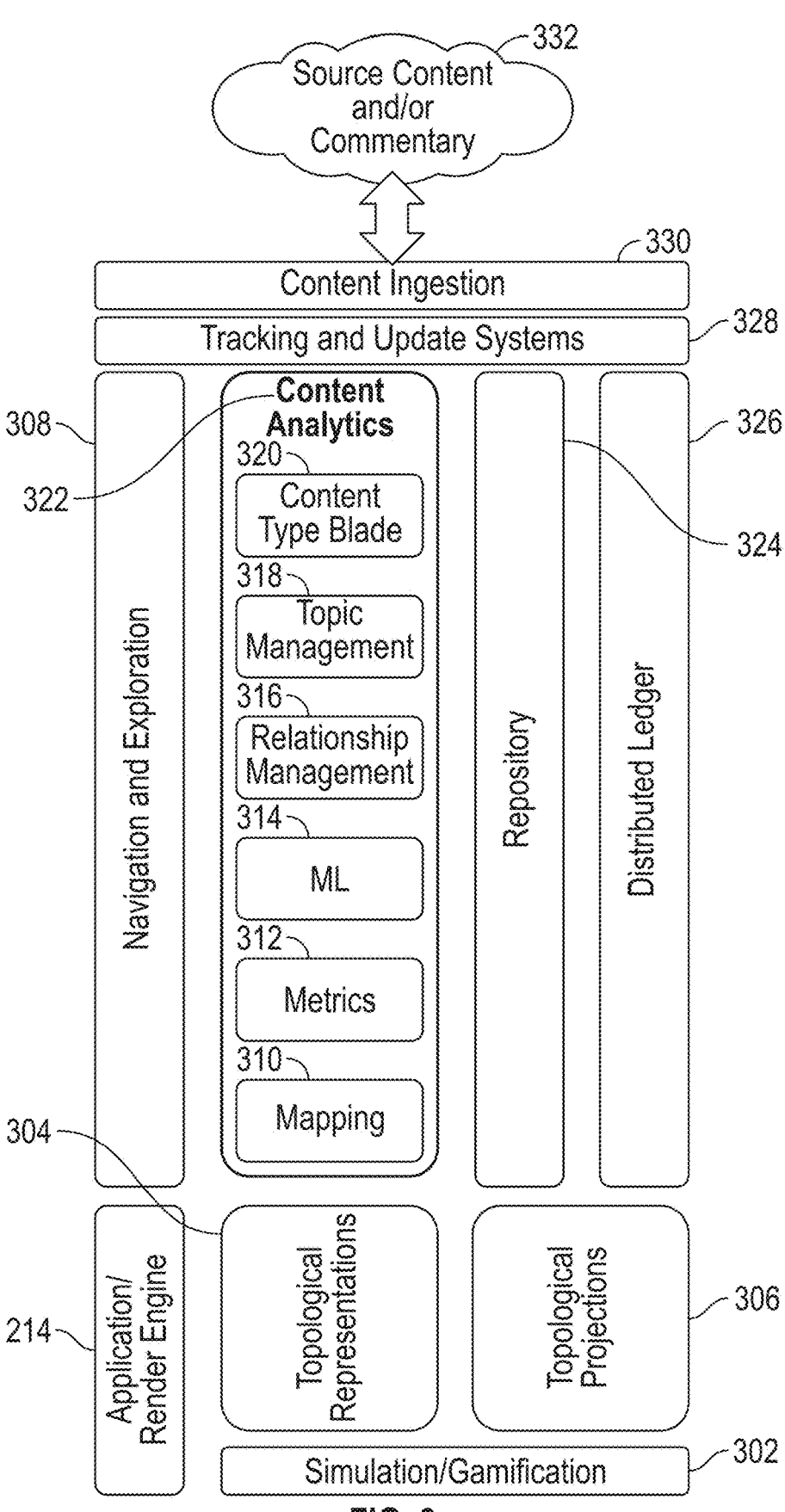
FIG. 3 illustrates an example overview of the system.

FIG. 3 illustrates an example of the system as it interacts with the source content and/or commentary 332. In some configurations, the various portions of the system can be separate modules which can operate independently from one another. In other configurations, the various portions of the system can be executed by one or more processors, but operate in tandem with one another. As illustrated, the source content and/or commentary 332 is received by the system via a content ingestion 330 portion, which (as described above) gathers and prepares the data for incorporation into a new or existing topology. The data ingested by the content ingestion 330 portion can result in the tracking and update systems 328 causing updates to existing topologies. These existing topologies can, for example, be stored in the repository 324. Moreover, the topologies within the repository 324 can be linked to a distributed ledger 326, such that there is an immutable record of when the topologies are updated or otherwise modified.

The system can perform content analytics 322 on the topologies. Exemplary forms of content analytics 322 can include determination of content type 320, topic management 318, relationship management 316, executing machine learning algorithms 314, identifying metrics 312, and mapping content 310 based on topics 318, relationships 316, metrics 312, and/or other information. Users of the system can use the navigation and exploration 308 portion to navigate and explore the topologies, as well as the topological representations 304 and topological projections 306 generated by the content analytics 322. The system can, in some configurations, use simulation/gamification 302 to encourage users to interact with the system. All interactions with the system can occur through an application (app)/ render engine 214, which prepares the information stored and analyzed by the system for navigation and exploration 308 by a user.

Formal and Non-Formal Roles

In some embodiments, the system can enforce a single identity for each unique user, where the uniqueness of the user is determined by a set of criteria that may be declared and/or instantiated by the system. For example, the system may provide a hierarchy of identity categories, each of which is defined and used in the configuration of the user identifier when the user initially engages with the system. This may be represented by tokens, indicia, or other representations that can be parsed by the system and interpreted by other users, with the result being that other users have confidence in the identity confirmation processes that have been undertaken.

In some embodiments, the system can support a user having multiple obscured identifiers, such that a verified user may use a system generated identity that obscures their actual identity, but provides a surety as to the validity of the underlying identity. That an identity is obscured may be represented to other system users, allowing the other users to know that it is a real (but obscured) user, rather than a bot.

In some embodiments, a user may adopt an anonymized identity, such that other users are not aware of the underlying identity of the user. This may be based, for example, on a user configuring their identity with a proxy that may be persistent. In such configurations, the user may, for example, accrue over time the benefits of reputation and other metrics, and yet keep their actual identity hidden. However, in some embodiments, the system may require a user to authenticate and validate their real identity even if using an anonymized account. Such authentication/validation may, for example, occur via biometrics, third party authentication, sovereign or government issued identity, and/or other authenticated indicia. Once the user has performed the authentication/validation steps, the user may then configure their identity to be anonymized.

In some embodiments, groups of users interacting with the system as communities, via communication spaces and/or via conversations may support (or not) the use of anonymized identities. For example, such groups may have the system configured so that the underlying real identity is visible and/or auditable. Such embodiments can involve the use of distributed ledgers at the system, community, communication space, and/or conversation level in any arrangement.

In some embodiments, users may be categorized based on their activity within the system. For example, a user may predominately or exclusively publish content to the system. Another user may only, or predominately, post comments. In another example, participants create, modify and/or in other ways engage in the process of commentary. Those that predominantly undertake commenting, can be classified as commentators. Each of the different types of user activity may be classified by the system so as to support navigation, exploration, and other system operations. The types of content posted by a user (such as a specific domain, type of content format, timing, and other aspects) may also provide further detail in the profile of a specific user. This information may be made available to other users and/or retained for system operations.

In some embodiments, a user may be offered choices as to the details of their profile that may be shared with other users. There are many aspects of the user profiles that can be managed by the system relating, and in some embodiments these may include such attributes as: domain expertise, sophistication, experience, interests, time (including availability), qualifications, and the like. Each of these may be self-declared, system calculated, or have verification and/or authentication (by the system and/or third parties), in any arrangement.

Another aspect is the reputation of a user, in that their actions within the system may form the basis of one or more reputation metrics, which may include one or more classifications, taxonomies, ontologies, or other organizing arrangement of that user. For example, a user may obtain a reputation as a contrarian, a supporter of a specific perspective, and the like. A user and their profile can also be expressed by numeric scalars, such as frequency of activity, memberships, followers, following other users, timings (activity, location based, duration and the like), relationships, and the like.

There can also be formalized relationships between content, comments, and users, which can be expressed as authoritative relationships to a particular perspective. For example, a user may post a content piece and provide a comment in support, in whole or in part, (or not) of that content element, thereby declaring an authoritative positive relationship with that content piece. For example, if the comment is in support of a particular point of view, then that user may possibly support other similar comments that are in alignment with that point of view. Conversely they may also provide comments or perspectives that are in disagreement with a previous perspective, thereby indicating that those comments/perspectives may not have their authoritative support. These metrics may form the basis of establishing, for example, in political, scientific or other data-driven discourse, the relative positions of the participants in the creation of content and commentary of that subject. In some embodiments, this can include a user selecting to have "willful ignorance", that is the removal of specific topic areas that may represent their personal navigation spaces, though, for example, filtering of topics.

The system also may also use machine learning and artificial intelligence capabilities which may act on at least one corpus to determine metric sets including those of reputation, perspective, authority, veracity, and the like. Such metrics can be declared as such, so that user generated reputation and machine generated reputation can be presented independently and/or combined. These combinations may include, by reference and/or embedding, the methods used to determine such metrics.

In some embodiments, at least one machine learning technique may be trained on metrics of commentary. For example, the machine learning may include techniques for topic recognition and extraction from the content and/or commentary, as well as for identification of threads of commentary (that is commentary with same or similar topic sets). Such techniques may include clustering, neural networks, deep learning, regression, dimension reduction, and the like. The results of these techniques may then be represented as at least one be hierarchical structure, for example form a temporal linear comment set, e.g. ML (Machine Learning) techniques.

One aspect of such an approach is representation and traversal of both inter-commentary and intra-commentary relationships between comment sets. For example a hierarchy of such relationships may be represented to a user and/or to another system element, whereby such an arrangement can include a categorization of such comments. The depth of such a hierarchy may be arbitrary, however, for at least the purpose of user navigation, such hierarchies may be reduced in depth or flattened, through for example dimension reduction or other simplification techniques, enabling the rapid and effective traversal of such representations by a user, whilst maintain the intrinsic relationships in the relationships.

The system can recognize various behavior patterns using temporal, similarity, linguistic, metric and other analytics to identify patterns related to users, specific or typed content, comments, comments on comments, groups, communication spaces, conversations, references, linear and nonlinear characteristics and the like.

These behavioral traits may be used by the system, users and groups thereof to evaluate communication spaces and the conversations therein, such that a particular discourse may be evaluated in light of the potential relationships with other discourses. For example, if a particular discourse has certain behavioral characteristics, which may in some embodiments be configured as metrics, that can be used as a predictive tool using probability techniques, and predict the potential behaviors of another discourse. This may be used in both a historical sense (e.g., to identify, for example, what event, or set thereof, caused a particular conversation to take a certain direction) and/or in a forward sense (e.g., to predict the potential impact of a comment, including sets thereof, on such a discourse).

Another aspect of this approach is the identification of particular types of threads within a communication space and/or conversations. For example, the identification of a thread of puns or other central or peripheral commentary in relation to the common threads of a communication space may be represented as a set, for example as an ontology.

A further aspect of the system is the capability to identify those commentary that, from at least one perspective is perceived as noise, that is material that has little or no relevance to the selected and/or calculated identified topic. For example, if a commentary has a primary topic, that is a topic which has metrics establishing it as "primary." These metrics can be calculated in different ways, such as, for example, 80% (or another predetermined percentage) of the comments are concerned with the topic; the acknowledged experts on the topic declare this to be the prime topic; word detection using natural language processing; etc. Through one or more such calculations the topic(s) are identified, then the system can reduce and/or remove unrelated topics (i.e., noise) from the commentary that is presented to a user whose interest is that topic. Such reduction/removal can, for example, occur by weighting the value of the comments.

Such an approach can include the use of taxonomies and/or ontologies, such that at least one topic can be represented in relationship to other topics. These topic arrangements can then be used to, for example, determine common behaviors of the commentator and/or sets of commentators, potentially for the identification of specialization/expertise.

Figure 4:
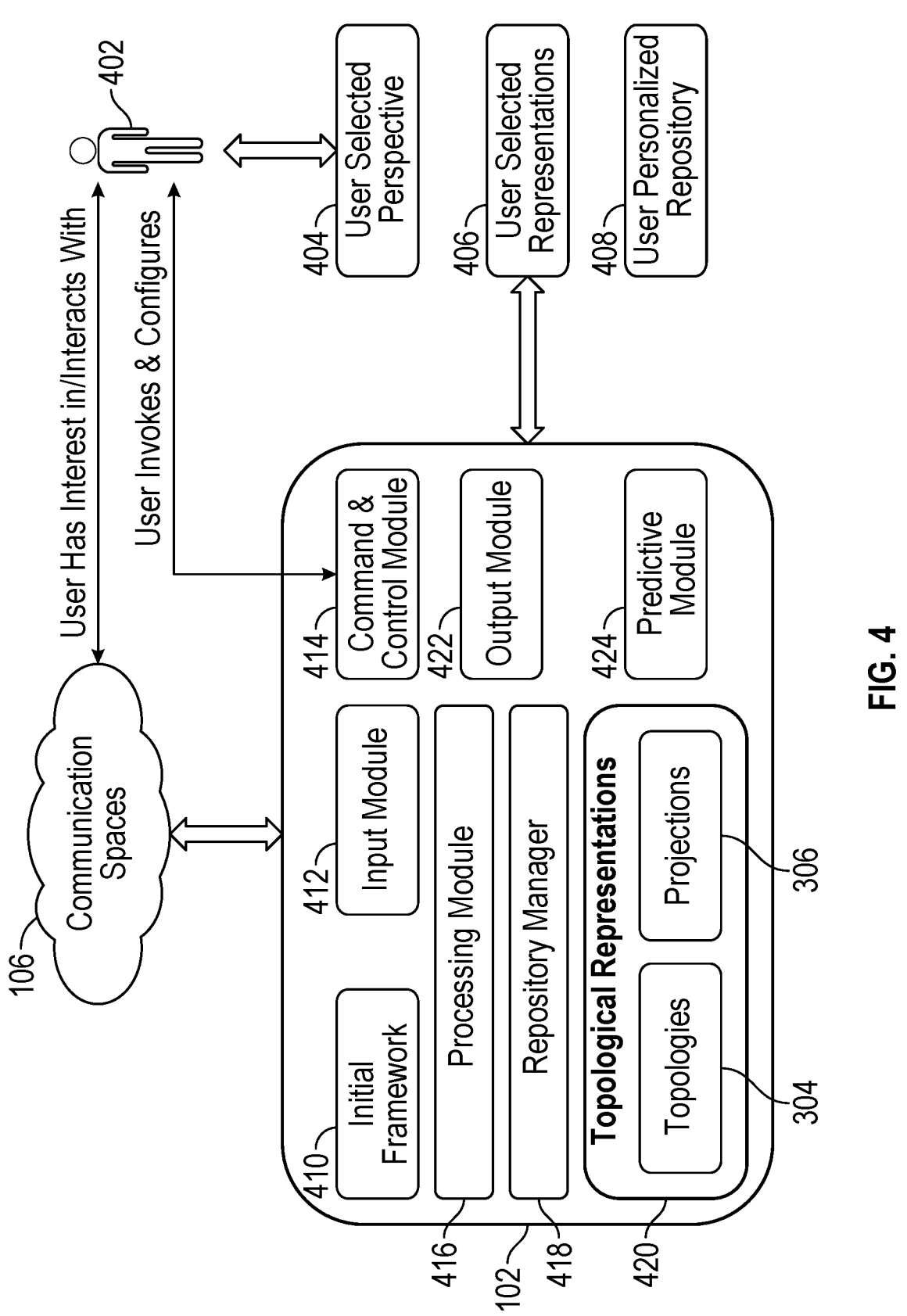
FIG. 4 illustrates an example of a user interacting with the system.

FIG. 4 illustrates an example of a user 402 interacting with communication spaces 106 and/or conversations therein. Here, the system 102 allows the user 402 to explore and navigate such conversations spaces 106, including the underlying content and/or commentary sources, so as to create their own personalized repository 408 of those matters in which they have interest and/or interact. This allows the system 102 to change between a general topic space to a customized, personal topic space, where the personal is a subset of the general topic space.

As illustrated, the user 402 invokes and configures the system 102. In this example, the system 102 contains an input module 412, an initial framework 410, a command and control module 414, an output module 422, a predictive module 424, a processing module 416, a repository manager 418, and stored topological representations 420, including both the topologies 304 themselves as well as the associated projections 306. As the user 402 interacts with the communication space 106, the system 102 modified the initial framework 410 based on the user 402 interactions. In some instances this can be based on user selected perspectives 404, or based on user selected representations 406. Based on those selections 404, 406 and/or on behavior, the system 102 can create a user personalized repository 408. This user personalized repository 408 can, in some configurations, be stored topologies customized to the user 402, whereas in other configurations the user personalized repository 408 can be settings specific to the user 402 which will allow the system 102 to create the user-specific content upon demand.

One example, can be the evaluation of the participation of a user in a conversation space, which can yield a sustainable and reliable identity, albeit in some cases one that is anonymized. For example, aggregating such evaluations across multiple conversation spaces can further provide patterns of behavior that are associated with one or more users and groups thereof. For example, if a particular group is attempting to influence a particular conversation space and/or conversation with the intention of determining a particular outcome, direction, conclusion, or other objective, the system and other users may be able to detect this behavior. The detection of such patterns may be used in a predictive manner, for example, based on previous communication spaces and/or conversations where the patterns and behaviors are similarly exhibited.

These behaviors, patterns, characteristics, analytics, evaluations, and other outcomes form dimensions in at least one topology and/or projection thereof. These may be persisted and used as, for example, system tools for navigation and exploration. Such dimensions may, for example, be based on identity characteristics, such as the quality, consistency over time, relationships, common commentary, topics, authorship, or other metrics of these identities, that have been involved in at least one participation in at least one discourse. For instance, a user may seek the most informed and respected commentary in a communication space which may, in part, be determined by the reputation of the commentators-such as when a particular set of commentators may engage in a conversation, and a user may use the navigation and exploration system tools to discover, monitor, and/or participate in that discourse.

In some embodiments, there may be commentary made on commentary (ConC). Often this will be a user making comment on another users comment. These comments on comments may represent diverse perspective in relation to the original content and may include short form icons and/or token representing a particular perspective (e.g., "likes", etc.). The system may provide a standardized set of ConC that a user may select to represent their perspective. In this manner similar ConC may be standardized. In other cases the ConC may be dynamic and change based on an emerging consensus of the user set that is involved in making such comments within a particular timeframe.

Some ConC may be verbose and have a significant amount of detail and information therein such as when a user forms a well-structured refutation of a comment. In such an example, this ConC may be presented as an alternative thread in the context of the original content, along with the comments thereon. In some cases, the ConC may include and/or be based on questions raised in response to an initial comment and/or content element. In such cases these ConC may take the form of verbose responses, the content of which may be interleaved into the original content and/or comments so as to, for example, remove ambiguity, add explanatory detail, provide clarifications, and the like. The system can, for example, distinguish between a ConC that needs a new thread and a ConC that should be interleaved based on a classier/topic extraction/taxonomy/ontology comparison and/or author/source selection.

This system ability can provide context that is often missing in current distribution systems. The system enables the integration of comment, comments on comments, and content to be formed into the new media type, such that a subsequent user can be informed of the context and relative salient aspects of a conversation and associated communication space, without having to trawl through all the material that is represented by that space. This may provide the user with a balanced set of information, representing the relative perspectives, and any associated metrics, of those contributing to such a communication space, such that they may add their own perspective in an informed manner.

In some embodiments, the system may, in part or in whole, generate a "meta commentary," which can include user and/or system generated material. For example, a discourse on a well-solved problem that those discussing such an issue may not be aware of, may have a meta commentary indicating that such a solution is available and that the current discussion is not adding any new materials to such a solution.

Metrics

The system can create metrics of the content, commentary, ConC and/or identities, such as authors and commentators, particularly in relation to the characteristics of the navigation capabilities of the system. Further, such metrics may form a part of the commentary itself, with the quantized actions, reactions, and other events associated with a specific event, time period and/or content, comment, ConC, or any other event expressed in the form of one or more metrics including such commentary.

Some metrics can be associated with a user of the system, in whatever actions they may be undertaking. In some embodiments, a user can only have a single verifiable identifier, such that all their operations with the system are unique to them. Any of a users' interactions with the system, in whole or in part, may also be recorded by a distributed ledger or other immutable recording.

Other metrics can be attributes of content, commentary, comments on comments, and/or the new media type. This can include any set of information that can be expressed as a characteristic, such as metrics, attributes, and/or metadata. Some examples include: quantities, time and time periods, relationships (including number and type), validations, verifications, sources, authors, readers, commentators, memberships (of sets, classifiers, ontologies, taxonomies and the like), content associations, topics, and the like.

In some embodiments, the system can provide a language for expression of such metrics, so that a user may create a set of metrics that represent their specific intent or interests, and that these metrics may be kept private to that user (and or their proxies) and/or made available to a wider group, including being part of system wide metrics. This can include standardized metric sets, including those used on a system wide basis.

The system can have predefined metrics, and sets thereof, that express, for example, consumption, searching behaviors and/or patterns, commenting, creation of content (including initiation of a communication space and/or conversation), associations, relationships, memberships, groupings, affiliations, distribution, sharing, ordering/ranking/priority and the like, any of which may be applied in any arrangement to any communication space and/or conversation in any arrangement. This can include voluminous sets of comments in large volume simultaneous commentary.

There may be multiple sets of metrics associated with and/or bound to content, including frequency of activity (for example render, access, commenting upon., linking to and the like), temporal (for example time of upload to distribution system, time of ingestion by the system, time before first render, comment and the like, duration, elapsed time before comment, elapsed time of render and the like), location, device types, render characteristics, and other sensors (such as biometric sensor data), and the like.

Metrics measuring the rate of change of commentary for content can be expressed as velocity and acceleration. In some embodiments, these metrics may be projected so as to have predominance over other system and/or user metrics. These two metrics may be key indicators as to the rate and frequency of changes in a communication space and/or conversation. This can be of particular importance to users not familiar with that discussion and/or users who, although repeat interactors with such discourse, may have periods of inactivity, in that they are occasional interactors. In this manner the user may be made aware, through such metrics if the relative importance of certain parts of a conversation and/or communication space. This can be valuable when the communication space and the conversations therein represent significantly large information sets and/or diverse sets of perspectives.

Velocity can be defined as the rate of new comments, and comments on comments that are applied to a communication space including at least one conversation expressed over time. The number of comments added over the time at which they are added gives a velocity, which can be expressed as comments over time. For example, if the time-base being used by the system (which in some embodiments can be selected as a parameter) is in seconds, the velocity could be ten per second. The number of comments may not be known on a real time basis, as new content may be added in real time, so the velocity metric includes a history function which shows the rate at which the velocity changes as the time from the event increases. This can include a layer function which can show the velocity of the comments as related to, for example, time frames (hours, days weeks etc.), external events, refences to the underlying content or commentary, and/or user/system selected criteria.

The velocity metrics time-base may be one that is specific to a user or group thereof, in that it expresses the number of comments ("ConC"), and other materials that may form a communication space and/or conversation since the last interaction of that user and/or group with that communication space and the conversations therein.

The acceleration metric can be the rate of change of comments on a particular content piece. The acceleration metric may have multiple attributes, for example the measurement of the rate of change of the velocity metric for a communication space and the conversions therein. There may also be rates of change in the number of comments that are agreeing, disagreeing, or representing a differing perspective, based for example on at least one dimension of the topology.

In some system configurations, acceleration, and/or velocity metrics may be emphasized to assist users in simplified determination of the dynamics of a communication space and/or conversation. These and other metrics may be displayed as interactive representations, such as histograms, 3D (three dimensional) visualizations, and the like, and can be made available to other visualization and HMI (Human Machine Interface) tools sets. However, other metrics, such as for example, jerk (the rate of change of the sentiment of comments on a particular piece of content or commentary) may predominate or be used in such simplifications. For example, a particular projection may be based upon at least one of these predominant metrics and can have an associated set of metadata explaining to a user the intention of the simplifications, informing the users of the perspective represented by such projection.

There may be metrics associated with the volume of materials that form a communication space and/or conversation, for example the number of content pieces, size and other attributes thereof, and the like. These metrics may also be used for the expression and/or calculation of velocity and/or acceleration metrics. This can include other derivatives forming further metrics and associated scalars that are calculated specifically by the system and/or by a user.

In some embodiments, the relative dynamic behavior of a set of comments over a specific time period can be described as the volatility of that commentary. This may be calculated through use of velocity, acceleration, and/or jerk metrics in any arrangement. Volatility of the commentary can be representative of the dynamic nature of a set of comments. For example, where a large number of users have commented, volatility can reflect the extremities of the scalar used to track if the comments were made in a short time of one another, if the comments are all similar or orthogonal, etc.

Dislikes, rating scales and the like may also be subject to acceleration metrics, where the degree to which the preponderance of comments shifts from, for example, predominately positive to predominately negative is metricized.

This rate of change metric may also have a history, as it can be calculated in real time and on an accumulation basis as the content and commentary is seen by a wider audience over a longer time period. History may use selected time periods, that for example, represent the period during which the majority of the activity occurred and/or enable a user, system process or other operation, to interact with the information sets representing period(s) of activity since their lats interaction. This may be beneficial, to a user, system or other processing, in enabling comparisons of such activity across multiple communication spaces and conversations. In some embodiments, such interactions may require authentication and/or authorization.

In some embodiments, such interactions can be considered in the terms of the new media type, such that each additional user who interacts with such content will impact the metrics of that content. In this example, a user who interacts with the content in an early stage of its distribution may see different metrics than a user who interacts with the content at a later stage. The associated metrics may be represented as a history, where, in some embodiments, such metrics history may be made available to both such users so that they can observe over time the changes such metrics represent.

Topological Representations

The information sets including the content, comments, their sources, authors, and any other attributes such as temporal information, metrics, analysis (such as topic extraction) and the like, may be stored in one or more repository. These repository may be in the form of and/or may be accessed by at least one topological representation, such that the information sets, in whole or in part, may be represented in a topological format, such as, for example, at least one of Hilbert space(s), topological graphs, manifolds, and the like.

These representations support the calculation and comparison of differing content and commentary, including commentary on commentary, and information sets through commonality of their topology attribute sets (determined, for example, vector analytics, patterns, statistical and probability based analysis, machine learning, and the like).

When a content element has been ingested into the system, it can be represented in a topological representation. For example, content determined to be associated with a particular linguistic token, or content created based on a topic set through use of computational linguistic techniques, may be localized in a particular region of such a topology. Other content may localize in another portion of the topological representation. For example, a set of the content that was commented upon by a particular user, but which is not based on a common topic, may be located in a different portion of the topological representation. These localizations are not mutually exclusive, as topological representations can incorporate as many dimensions as is necessary to utilize all available data and information sets, and elements thereof, that can contribute to that topology. For example, each piece of content occupies an n-dimensional space where its analytical processes have added at least one dimension to the topological representation.

The use of topologies for representation of information sets creates opportunities for the parsing of the dimensions of such topologies to create, for a user, system or process a set of information that is useful to those interacting with the topology. The flexibility of multi-dimensional topologies is such that commentary, including the original and any other content, may be combined in the form of the new media type in a manner that informs the user, system, or process that is interacting with the topology.

This interaction may result in a further set of comments and/or commentary, including content elements, that may in turn form a further content element that may have further comments and commentary associated with it. In this manner the topology can support multiple conversations, and in some circumstances multiple communication spaces that have, at least in part, a set of common information sets as ancestors.

In some embodiments particular content elements may be evaluated for similarity to one another. For example, attributes, timing, authorship or other identifying characteristics, may be evaluated by at least one process configured to do so, resulting in similarity between content items. In some configurations, this similarity can be based on accumulation operations using a common shared topology. Some pieces of content may be localized within the topology (i.e., similar) due to their having been commented on by, for example, a particular user.

Still other content can exhibit a cluster or shape based on similarity, for example, that associate with serial viewing by a user. In particular, each long-format video will likely be viewed in a single sitting, such that the individual pieces of that video are chronologically similar from the user's point of view. These resulting topological representations can therefore include the entirety of a huge collection (like YOUTUBE or VIMEO), or may be a more focused corpus.

Likewise, the temporal nature of both the content and commentary can provide context for the content and the commentary itself, resulting in the content and commentary being localized within the topology based on their respective timing. For example, if a commentary refers to an event, either in the content or an event external to the content, this can provide a contextual temporal framing for both content and commentary.

The creation of a topology can, in some embodiments, incorporate a specific structure that is intended to organize the information is a particular manner. For example, in a communication space representing a discourse on a deep technology or scientific subject which is instantiated as a topology, the topology can be configured with a structure that is an optimization of that material, from the perspective of the intended user set. The system supports the identification and characterization of new topological representations that are optimized for particular user groups and/or types, specific topic sets (such as a particular scientific discipline, sport, hobby and the like), communication spaces, conversations, and other organizations.

A user may have a set of topics, a hierarchy, taxonomy, or other organizational arrangement which can form the basis for an evaluation of a topology. This is particularly the case where the relationship between entities within the topology and the relationships within the user's organization are used as a basis for comparison. As an example, an index or folder hierarchy of a user can be compared with the topology. The decision mechanism used by the system can be based on machine learning using feature sets, classifiers, topic extraction, and metrics of context, association, derivation, similarity, or other relationship expressions. Based on the metrics and/or the output of the machine learning, the system can then decide that a particular structure should be used for a given topic.

Topological dimension reduction may be employed to, for example, manage storage requirements, configure a topology, simplify calculations, or in other ways configure a topology for at least one set of operations. In some embodiments, these dimension reductions can aid in the identification of hidden features in information sets forming the topology, through for example, the use of machine learning techniques, specifically neural nets, deep learning and regression techniques.

For instance, one way a dimension reduction might be used is if a plurality of users are doing the same or similar interactions. For example, if a particular video is very popular, but raises a critical question that significant numbers of users clarify by watching an annotation to the segment of playback, then that pathway through the topology can yield a dimension reduction. Unlike some situations where the dimension reduction may signify an unimportant portion of the space, these dimension reductions can serve to show places where an interesting feature of the topology is present. Identifying locations in the source material (as represented in at least one topology) where many users have behaved similarly and/or expressed a common interaction can provide significant informing characteristics to those interacting with the system.

This dimensional reduction can form a framework for a communication space and/or conversation that can, for at least one user or group thereof, express the essence or essential aspects of that space. This may be highly informing and considered as meaningful and purposeful to those users sets. The determination of such dimensional reductions can be configured by the system, a user set and/or machine learning, or other processing. The benefits of such reductions can, to a large degree, be evaluated by the user set, who may then express such benefits in the form of commentary and/or representation of these reductions as further content elements in the new content format.

Topological Projections

In some embodiments topological projections can be employed to create representation of the one or more information sets in at least one topology. These projections may be in differing formats, such as visual, mapped, dimension reduced, and/or as data sets of those projections that are suitable for manipulation by a user, and/or their proxy, for their purpose. For example, if a user configures the system elements to create a projection, the system can project a set of comments which are organized by velocity, acceleration, and/or other metrics of those comments. In such projections, the set of comments can be presented, for example, using vectors that form a graph representing such a perspective as a projection. This graph may then be persisted in at least one repository and the relationship between the graph and the original content set may be represented by yet further metrics and/or representations, including as further topologies.

An extension of geometric projection utilized here is topological projection, where features of a complex topology can be made to appear in a new ordering, based on sighting from a location or perspective of interest and extending vectors through a topological construction and onto another (typically temporary) feature set in the topology (e.g., a plane). This allows inherent structures of the topological representation to be exploited in a manner that utilizes the inherent structure for new purposes. Such a purpose may be user determined. For example, the user can cause the system to create a projection including all the puns made on a particular topic or aggregating those data that are in agreement with the user's point of view on the topic.

The use of dimensions of the topology as means to create such projections creates a simple and powerful capability, where each dimension set can provide a simplification of complex interactions, typical of a multi user, multi temporal conversation and/or communication space, that are deemed to be useful to the user, including a set thereof, creating such a projection. Unlike many existing systems, the dimension sets are only limited by the number of dimensions within any set of topologies, enabling users, their proxies, and system capabilities to identify characteristics of communication spaces and the conversations therein that have been traditionally difficult, if not impossible, to represent.

For example, when a media segment and commentary thereupon is represented in such a topology, the original media segment and commentary upon it has an inherent clustering and locational aspect that is described as proximal, and as such may be likely to form part of projections based on this material. Particular usage patterns by groups of users who share particular properties can be evident in some projections, and may be absent in others. Projections of and/or transits through a topology, including those based on what may have been determined as the predominant dimensions of such a topology, may result in media and/or commentary, which can form (in whole or in part) new content elements that can be created. These elements can, in real time, be represented to best suit the needs of a particular user set, including predetermined and preconfigured users sets, such as those of a demographic nature, particular interest, particular perspective, and the like. For example, in a sports context, these may be classifications of team supporters, expert or occasional viewers, and the like. Such representations may then be made available to other users who share key characteristics, memberships or other attributes who have consumed this media before them.

For example, projections can include traversals of the topology suited for novices to a particular subject. For example, a novice, who may be self-declared or calculated as such, may need basic contextual information included in the projection, which although not part of the projected information sets is relevant to that user gaining an understanding of the conversation and/or communication space. This contextual information may be in the form of further projections that have been created by the system and/or other users, and may be based on the predominant, if such exists, dimensions of the underlying topology from which the projection is derived. The converse may, for example be the case with a subject matter expert, where the degree of contextual information may be minimal. The degree of context can be selected by the user, their proxy, and/or system configurations, for example as part of the navigation and exploration capabilities of the system.

Another aspect is the degree of familiarity a user may have with a conversation or communication space. For example, if the user has not interacted with a conversation or communication space previously, then the historical context of the evolution of that conversation and/or communication space may be presented to the user. This may leverage the dimensions selected and projected by other users, may include ranking or ordering based on metrics associated with such projections.

The relative expertise of the user may, in part, determine the degree of context or history of a particular conversation or communication space that is presented to a user. The user may also select the degree to which they are presented with such information sets, including the timing, depth, content, relationships and any other attributes.

For example, traversals for experts (who may not need to see postings that are too elementary), academics (who may want to be piecing together a thorough and referenced ontology or taxonomy of this section of the topology) may be presented in a manner appropriate for each user set. The system can support any number of projections in support of any users set, based on the topological representations. This can include the use of dimensions of those topologies for organization, searching, identification, definition and any other information management in any arrangement. The topological space can be queried based on content analytics, however it can also be interrogated by atypical queries, such as "how do people with my educational background approach this material?" or "it's been a few weeks since I looked at this topic, show me where there's been activity" or "show me what's controversial here." Each of these atypical queries may be parsed into a format that can be correlated with the dimensions of the topologies being queried.

In some embodiments, such projections and the underlying information sets they refer to, may be tokenized, for example in the form of an NFT (Non Fungible Token) or other transactable entity, such that at least one token can be provided to at least one user of the system.

Navigation

Users can navigate the topologies stored in repositories using key terms, metrics, etc. They can also use a full range of commentary types for search, retrieval, navigation, and exploration. This can include the creation of new media types formed from information sets represented in at least one repository, such as a topology, where a unique instance including a combination of content and commentary may be created, persisted, published and/or distributed. This new media type can represent communication spaces and conversations therein, and using the dimensionality of the underlying topological representations and the associated one or more projections, create a unique perspective on those information sets. These may in turn be made available to users as a further communication space and/or conversation that can then undergo similar management and processing.

The system can use metrics describing the velocity, acceleration, and/or jerk of commentary in any arrangement, which are indicators of the relative volatility of that commentary. These can be represented as standardized dimensions on a system wide basis. These can then be configured and combined with content, author, and/or commentary specific dimensions, which can also be system wide and/or standardized, and represented in at least one topological space.

Further, the rich histories of the commentary development also allows for new modes of repository representation. Users can, for example, formulate queries about changes (including rates of change), metrics representing degrees of expression in commentary (such as excitement, apathy, acceptance or other collective behavioral traits), degree and metrics of controversy (expressed in some embodiments by using argument notation systems), and the like. They may also formulate queries that track a communication space and/or conversation, including topic sets therein, such that the system may create and provide events and/or notifications indications changes in those communication spaces and/or conversations. These events and/or notifications may be based on one or more thresholds set by users, set by the system, and/or set by other processes, such as for example machine learning algorithms. topic and notify them when something's heated up in a subject area the users are intrigued by or are following.

The system enables users to create and persist such queries in manner that is bound to the communications space and/or conversations which they wish to track, such that only when an event related to that communication space and/or conversation occurs, which may in turn be filtered by the information set of that event and at least part of the communication space and conversation to which it refers to is returned to the user. Such event notifications may be provided by the system or through user and/or system selected third party methods.

One aspect of the topological projection is the ability to navigate an information set, including multiple entry points for that set. For example, navigation can be based on time, topic, author, content, commentator, scalar metrics (e.g. number of occurrences) or any other dimension, or set thereof, of a topology and the like. The topological projection that may be used can represent a distillation of an information set that includes content and commentary, and may be persisted to form a navigation component of the navigation system. This navigation component may be specific to a particular information set and/or may be independent of any specific information sets, representing a general navigation component. The component may have attributes and access, authorization and/or authentication attributes that form the conditions under which such a component may be used.

The navigation and exploration capabilities for the system may include one or more tools that can be applied to a communications space and/or any set of content and commentary. These tools may be used in any arrangement. In some embodiments this can include sensemaking tools, which can utilize a schema on read approach to provide and configure an organization structure supporting at least one sensemaking perspective of the information set being evaluated. For example, this may be based on at least one projection from a set of dimensions of a topology. These tools can incorporate lexical and semantic organizational frameworks, for example ARGUNET and similar argument mapping tools and/or computational linguistic techniques that are well known in the art.

The sensemaking, for example, may incorporate at least one topic and the relationships of that topic to the content and/or the commentary. For example, if the commentary refers to a specific other content piece, author or other identified entity, this could be used as a foundational element in the configuration of a sensemaking schema. As another example, such a sensemaking tool may be used to extract the discourse-rich comments from a set of comments. These comments representing a degree of opinion and/or perspective on a set of content and/or comments have sufficient common discourse-rich characteristics, such that commentary remaining after filtering is substantive commentary which forms part of the discourse, as represented by commentary.

Some tools may use metrics to provide navigation and exploration functions. For example, tools can be used to provide a quantized framework for the evaluation of those comments that include substantive discourse and those that are opinions in terms of agreement or disagreement with previous commentary. This may in turn form a metric and scalar representation of those opinions, where the degree of positive or negative agreement with content and/or commentary can be represented. For example, this may involve a scalar based on a number line with positive and negative integers (including fractions thereof), and/or graphic or other icon based representations of same. In this manner, overlapping comments may be quantized into manageable arrangements that provide a perspective on the range and scope of commentary.

One aspect of navigation is the creation and/or use of points of interest (POI) in linear material, for example video or audio, where a marker denoting a POI and/or the start or end of such a POI may be bound to such content. These markers may be created by the original author of the content or a commentator on that content. In some embodiments, the role of the marker creator is declared as is their identity. These markers can then be used as reference points around which commentary may be sought or created. Each user may create their own markers which represent their interest in a particular section or segment of the linear content.

Figure 5:
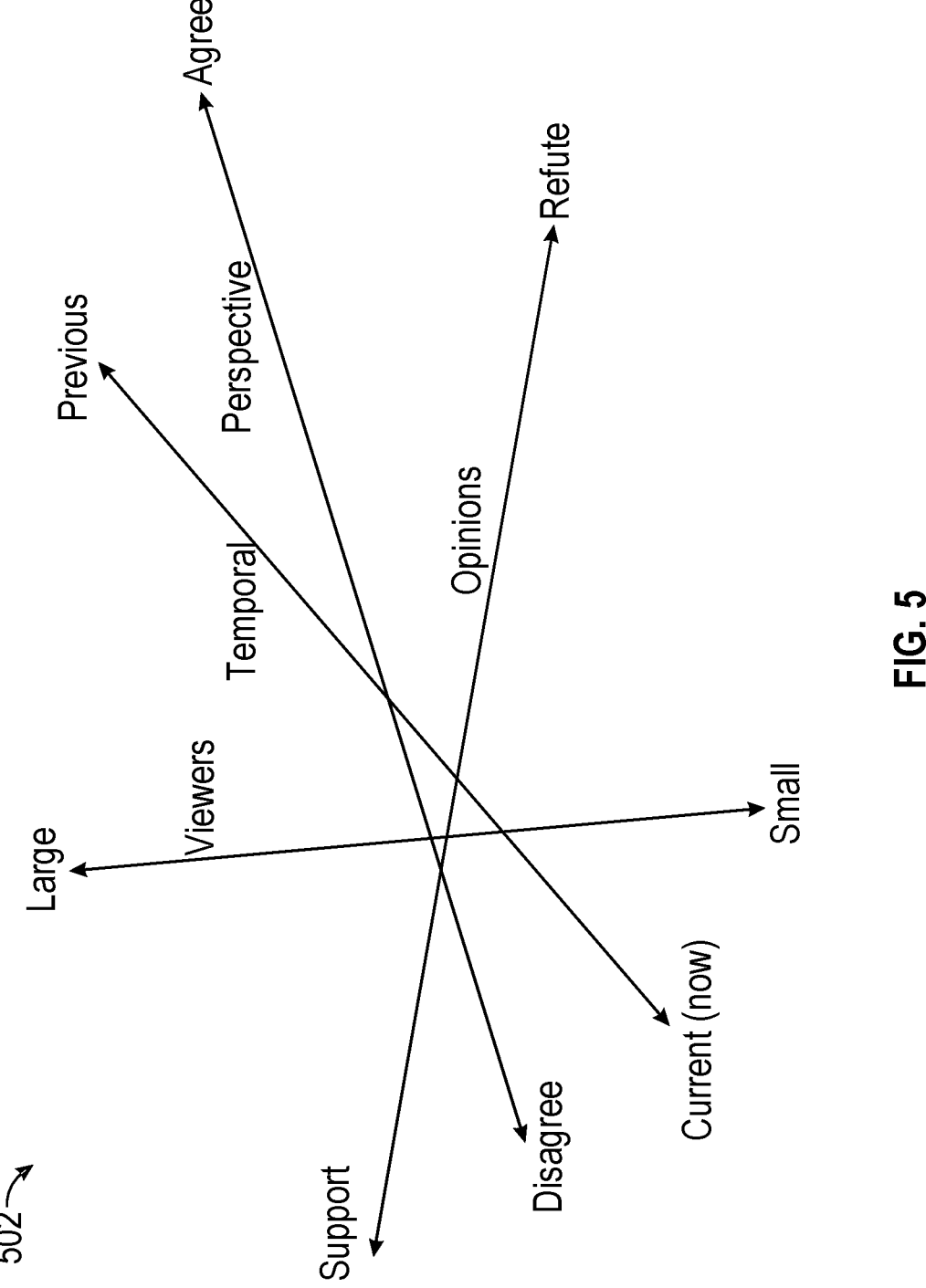
FIG. 5 illustrates an example of dimensions and dimension reduction.

FIG. 5 illustrates a simplified example of a set of dimensions 502 with incorporated scalars, which may incorporate metrics, shown as end points of those dimensions. This illustrates simplified dimensions with their scalars-thus comments may be grouped along the axis of each dimension (e.g., as a histogram or topic cluster, etc.).

New Media Type

The system described herein supports the creation of a new media type, which incorporates current existing content types and integrates commentary on that content (including comments on comments) combined with unique navigation, representation, repository and management systems.

Current systems typically have source content and the commentary represented as separate entities, often using a tree or directory structure for their management and representation, and establishing a distinction between original content (often represented as first-class items) and the comments (often represented as second-class items). Although convenient both for implementation and management by computer systems, such an approach does not support effective navigation and understanding of the content/commentary that is representative of the essence and context of all the activity involving both content and commentary.

To achieve this integration of content and commentary, the system provides a number of unique features that support using a new media type, rendering system, metrics, integration strategies, navigation and retrieval systems, rights support, enabling architecture, and enabling infrastructure.

In some embodiments, a content instance can be considered as an event, in that the content was created at or over a specific time, resulting in the production and publishing of a content entity by at least one author or their proxy. The current use of folders and directories, as used by all computer operating systems, provides inadequate means for navigating and retrieving such content. In such systems content is accessed through topics, sentiment, time, author, or other metadata often through search engines whose primary function is the generation of revenue through direct or indirect advertising and promotion.

The system described herein incorporates these events and retains their temporal and other characteristics. Using the new content format the system integrates both content and commentary into a single manageable framework that can be represented as at least one topology with dimensions representing the characteristics of the content and commentary. With the support of the projection capabilities of the system, a unique and valuable perspective may be obtained by the user through use of the system navigation and exploration tools. This enables a discourse to be represented in the form of a communication space and/or conversation.

The system recognizes that any content and/or commentary that is published can accrue an audience, individually or collectively. The metrics of such an audience, such the size, demographics, temporal or other time based measures, locations, devices, intensity, activity, and the like, can have a significant impact on the further dissemination of both the original content and any commentary that an audience may review and/or create.

The system can also provide an audit trail which may be instantiated for any content, starting with the initial publication of a content piece to a distribution channel, where the system then can track the events and operations (including commentary) of and bound to the that piece of content. This can be undertaken when a content piece is ingested into the system by at least one user. For example, the system can identify and create an identity for the received/ingested content, and enable tracking of any operations associated with it. Once the content and any commentary is ingested the combined content/commentary becomes part of the new media type, and as such the system functions and metrics can be operated on that content.

The system can provide for commentary and additional content to be bound to and/or associated with the original content using the new content format, independent of the original publication and distribution means. For example, if the original content was published to YOUTUBE and the initial comments were on the same distribution system, the system may continue to track, monitor, and manage that content and commentary—while also (sequentially and/or in parallel) providing users with the ability to reference and ingest other content/commentary and make further commentary on that original content. In this manner the new media type uses the topological representation as a format for the storage and management of aggregated content and commentary. It should be noted that in the system the new media type content and commentary may have differing access, authentication, and authorization criteria, which may be created by a user (or group thereof) and/or the system.

The system can also provide for the creation of commentary intended to aid a user or viewer of the original content, such as tags or other indexing of the content by the author or others. For example, an author may publish a list that segments their original content, such as a linear video, into sections, where each section has additional material describing that section. This material may have tags that aid search or other retrieval systems to identify a segment based on a query. Such indexes can be a form of commentary, which in some embodiments, can be categorized as:

Informational—conveying at least one information set about the content

Value judgmental—providing at least one scalar value judgment on the content

Figure 6:
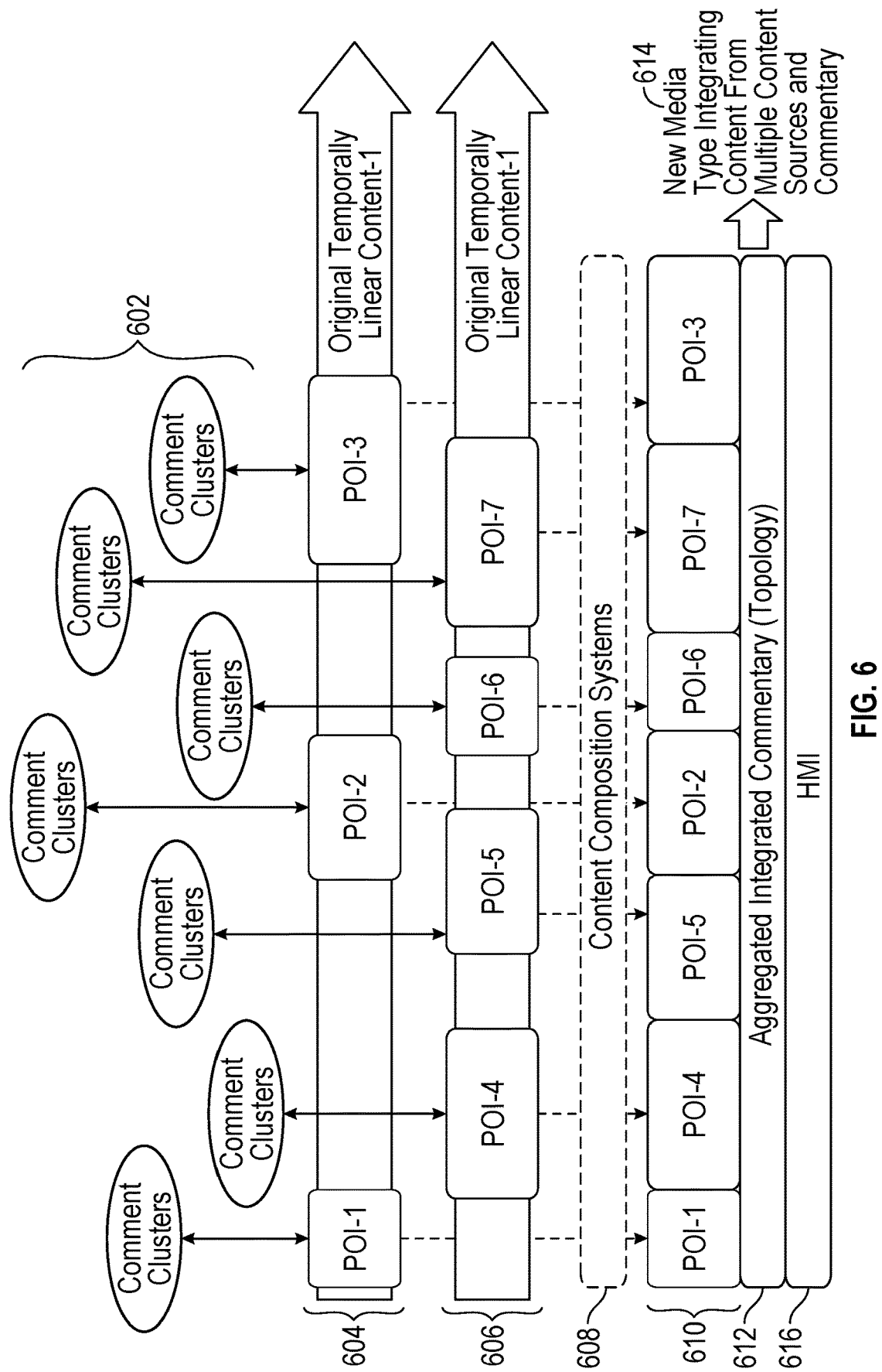
FIG. 6 illustrates an example of comment and event clustering.

Referential—providing at least one reference to other content, commentary and/or related material FIG. 6 illustrates an example new media type 614 constructed using comment clusters 602 based on two original linear content sources 604, 606, with the relevant point of interest (POI) are, along with the commentary clusters pertaining to them, formed into a new media type that integrates these POI 610 and comment clusters 612 into a form that can be stored as a topology, published as a new media type 614 and made available to users through a human machine interface 616, including for example an application incorporating appropriate render technologies. To combine the POI from the original sources 604, 606 into a combined list of POI 610 for both sources, and to aggregate the comment clusters 602 into an aggregated, integrated commentary (topology) 612, the system uses a content composition system 608 which can evaluate the POIs and commentary based on topic and/or temporal location, then adjust the temporal locations of both within the resulting combinations 610, 612 such that there is reduced/eliminated overlap of comments/POI in the resulting combinations 610, 612.

System Embodiment

The system described herein may be a computer system, where one or more processors seek to execute instructions stored within computer-readable storage media. These instructions enable the system to, for example: receive, configure, and process content and/or commentary; ingest and/or process the content/commentary to create the new media type described herein; and/or provide appropriate navigation, exploration, representation, management, storage, and rendering capabilities.

The application and render user interaction aspects of the system may incorporate aspects of the overall system according to the constraints of the underlying device, such as a personal computer, smartphone, or the like. Such user interaction capabilities may maintain a connection to at least one cloud service and enable processing to be undertaken with appropriate resources while still enabling the device to present to a user a representation that enables them to navigate and interact with the new media type.

Source Materials

The current unorganized material that exists on the internet includes a set of data types intended to provide human readable communications, such as video, audio, text, images, graphical representations (e.g. charts, etc.). Each of these types may have further metadata, such as commentary made by the original author or other parties, and in some further examples, there may be commentary on that commentary. Each of these data types may be processed by classifiers that provide a set of metadata that can be associated with and/or bound to that source material. For example, image recognition systems that can identify and classify images. In the text processing domain, text classifiers can identify nouns, verbs, phrases and other grammatical and semantic characteristics. The classification schemas used for such processing may include those determined by experts, generally accepted as standards, created, and/or declared by a set of users, and/or identified by at least one machine learning technique.

Many of the linear forms of communications can include temporal markers, such as a timecode or other representation of linear time, that can be used to identify a specific segment of, for example, a video or audio recording.

Input

Input received by the system can be parsed in a manner suitable for further evaluation, with each input type (for example, video, audio, text etc.) being parsed by one or more processes. This can include syntactic and semantic analysis, including identification of nouns, verbs, and grammar, phrases and common artifacts (such as emojii's, likes, "thumbs up" and their equivalents), sentiment analysis, and other linguistic evaluation techniques, including (but not limited to) voice stress analysis, facial recognition, location identification, temporal analytics, and the like.

To identify the input, the system can use a classifier may operate to undertake, semantic, syntactic and/or grammatical equivalence, phrase or other linguistic evaluation techniques, including NLP (Natural Language Processing).

Parsing may involve statistical techniques, including frequency, counting, temporal measurements, machine learning, and other probability-based techniques. For example, parsing may include analysis of the timing on content, comments, and comments on comments to ascertain such metrics as the rate at which a comment or source material event causes additional comments to occur.

Each input format can have a set of evaluation tools that are applied to that content to create a set of dimensions for storage and further processing in a suitable repository. For example, a text file may use a lattice to store each segment, where a time delineated section of a video (e.g., a stream, TV (television) or other broadcast, recording, etc.) or other conversation and/or communication space. For example, if a live sporting event is being broadcast, commentary may be part of the broadcast. The system's input processes may ingest and use the commentary from the broadcast as a framework to which additional commentary can be added, with that additional commentary coming from multiple sources, including additional commentary provided by the broadcaster, such as second screen and the like. This may include aligning additional commentary with the real time commentary from the source for navigation after the occurrence of the event the additional commentary refers to. In this manner the system may navigate the commentary to identify those clusters of commentary that may be of interest to at least one user. In some examples the broadcaster may be aware of, enabling, supporting, providing resources for, and/or participating in the commentary. In other examples the broadcaster may be unaware of the commentary stream on their broadcast content.

Each input can be processed through a set of evaluation tools. These tools can be used in multiple passes (that is, the system can re-run the evaluation tools periodically over time) as the relationship between the original material under evaluation and the tools for that evaluation is retained. This overcomes the problem of having to recognize the relative importance or other metrics or evaluations of the source material at the time of evaluation.

In some embodiments, a distributed ledger may be used to retain the relationship between the original source material, the processes applied to that material, and the topological representations of created by such processes. This can include a framework that is the initial representation of the source material. The distributed ledger can provide an immutable audit trail for verification that the source materials, the processes applied to those materials and any derived representations are verifiable as such.

An example framework of parsed data from source material can include:

a. Time base—time information of the original source material, including start and end, segmentation information, such as natural breaks in the continuity of the source material and other temporal.

b. Source metadata—any information that is part of the source material that is metadata, such as capture device (s), settings and configuration, operators, time-zones, locations, system stream settings, original broadcasters, time of day, any descriptive information, such as director, editor etc., naming of the source material, such as for example "interview with Mr X", and the like.

c. Comments: any comments that are associated and/or bound to the source material.

Although any material may be processed and parsed in this manner, an efficient embodiment can involve the use of comments as a key indicator and provide a tag or point of interest which is part of the initial framework. In this manner the commentary can become the indicator of the importance of a part of the source material, effectively providing a map of the terrain of the source material as portrayed by the commentary.

The system's input processes can accept any content type, and is extensible so as to accommodate new media types and combinations as they emerge. In most cases these content types have a temporal association with a time and/or place.

The system's input processes can include a tracking and update process which retains the original sources of the materials ingested, and instantiates monitoring of those sources for updates, modifications, or other events pertaining to that material. This can include using bots or other automatic and/or autonomous systems to track and update the content ingestion system operations. In some cases this can include tracking multiple sources and distribution systems, such as when content and or commentary spreads across multiple sites.

Processing

Processing of content may be done using one or more content analytics algorithms. Each content analytic algorithm can include a set of self-contained functional processes, each with at least one analytic function, that can be used to process the ingested materials in any sequence, priority and/or arrangement.

Content analytic functions can conform and normalize the content material into the appropriate format of the system, which can be suitable for representation in at least one topology. One aspect of this function can involve ascertaining the appropriate initial dimensions, either through evaluation, configuration, processing, and/or declaration.

The input processing of the system can include relationship management which retains the original relationships of the ingested content and commentary to each other, their authors, sources, temporal information, location, device, and/or any other content or commentary types that are bound to or associated with that material that can be resolved to an end point.

In some embodiments, semantic analysis can be applied to content and commentary, resulting in an organizational arrangement of both content and commentary that can form dimensions within a topology and/or a projection thereof. These organizational arrangements may undergo further processing to establish ontologies, taxonomies, argumentation structures, hierarchies, and/or other organizational frameworks that may be traversed by users, their proxies and/or navigation and exploration tools.

In some embodiments, an analysis of the commentary may involve the identification of terms and topics in a set of comments that are relevant to the trend of those terms and topics. This may include using, for example, relevance ranking using an extensible ontology formed by the terms and topics used in the conversation.

Commentary may be identified as not relevant to the conversation and/or may be determined to be divergent from the flow of the conversation. These comments may be flagged and used as metrics for the management of the commentary, including use by feature selection and dimension reduction techniques employed as part of the topological representation of the conversation. Sets of metrics may be declared and/or calculated by at least one function using at least one process to establish at least one metric of the ingested and processed content.

A topic extraction function can process the ingested content to identify salient topics that the content contains, references, or has a relationship with. The system can identify salient topics using topic extraction/recognition techniques provided by NLP, semantic/syntactic analysis, etc. This may include identification of the one or more entities included in the content, as well as those authors and commentators that are associated with the content.

Figure 7:
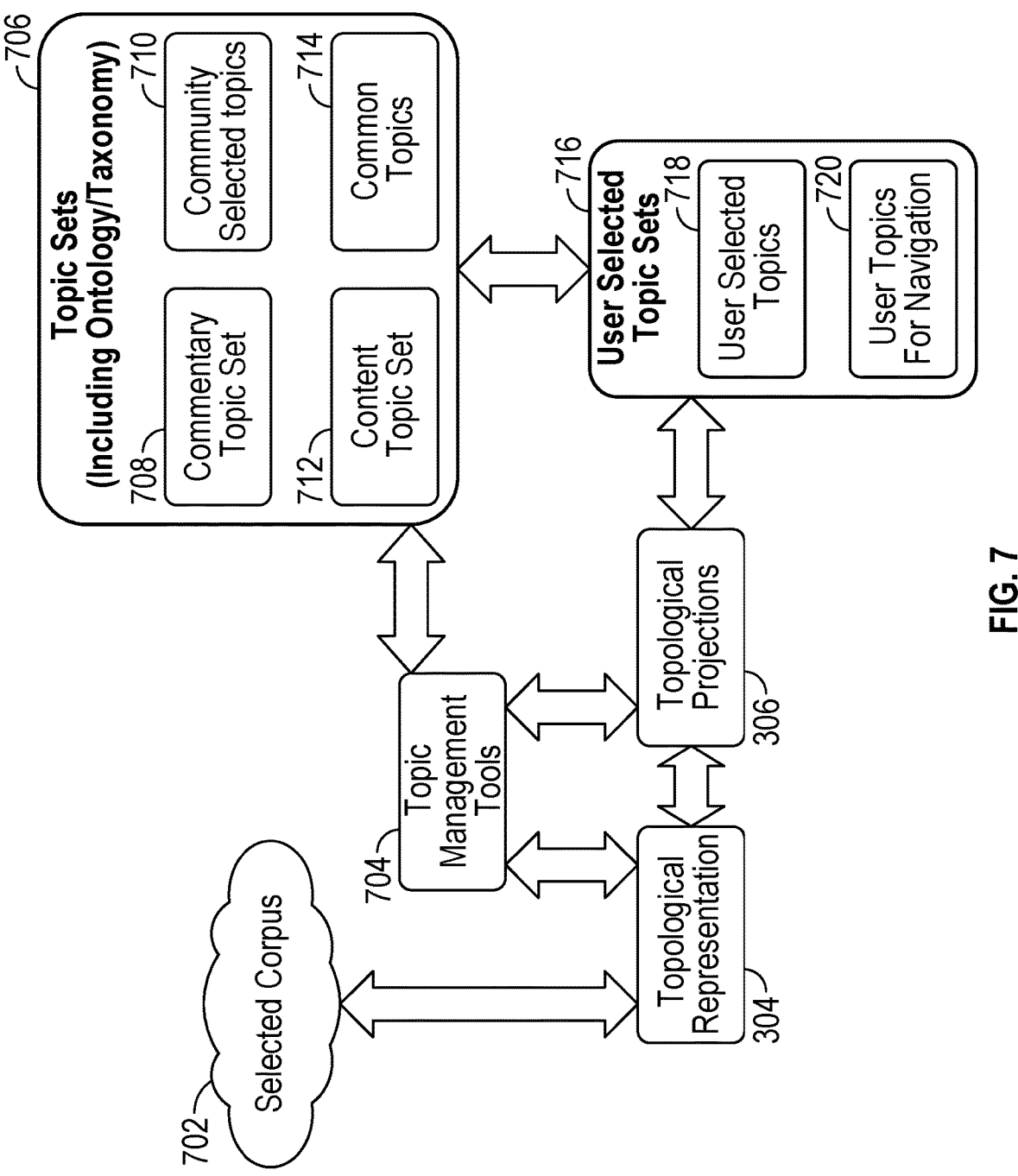
FIG. 7 illustrates an example of topics and topology.

FIG. 7 illustrates an example of a topic management tools, including the creation of topic sets 706 for commentary and/or content, which can then be used by a user as their topic sets and for navigation. The system, as disclosed herein, can transform a selected corpus 702 of information into a topological representation 304 and topological projections 306. using topic management tools 704, the system can generate topic sets 706, including commentary on topics 708, community selected topics 710 (e.g., where the community has identified a particular topic they would like to know about), content topics 712 (e.g., given a set of content, what are the topics therein), and/or common topics 714 (e.g., a summarized of the topics within the selected corpus 702). The user can select portions of the topic sets 706, resulting in user selected topic sets 716, resulting in one or more of user selected topics 718 and user topics for navigation 720.

Topological Representations

A topology can be used to store the source material and any processing of that material. In some configurations, storage of the complete source material may not be practical or intended for practical reasons.

For example, a college lecture may be received as source material from the originating authors or their proxies, and the system may undertake input processing on that college lecture, with the result being (in this example) creating a temporal index of the materials and highlighting specific topics in the timeline. This framework may be used as an index for that source material, forming a segmentation of the original material that can be stored in a topology, where the dimensions of such may include, time, topics, viewers, commentators, and the like. Other processing of the incoming source material can include evaluation of the commentary that is part of the source material and/or commentary/information which can be reliably associated with the source material.

In some configurations, the topology may be time independent, such that content may be initially recorded in the topology before any processing is undertaken. Then, over time, the system can evaluate the relative importance of the information.

Topological Repositories

In some embodiments, a representation of a conversation and/or communication space is a reduced set of the information originally captured (such as the source materials). In many circumstances, this may include a framework which is provided by the initial input parsing, for example segmentation of the source material based on aspects such as time information, salient features, (e.g., each segment being associated with a particular topic, event or other feature). Where the source material includes commentary, either by the author or third parties, this may also form part of the framework.

The initial framework may be represented as a topology. In a first example, the topology can be a lattice, where each of the elements of the source can be represented as a layer in the lattice. In a second example, the topology can be a topological space, such as a Hilbert space, manifolds, and the like. Each topology can include a series of sets that can be arranged in manner that is suitable for organization of the information representations of the communication spaces and conversations that have been parsed through the input processes.

The topology can include open and closed sets, where, for example, a closed set may represent the initial framework provided by the input processes of the source material. Open sets may be used to represent the various commentary for that source material. This can include comments on comments and links to further materials that a commentator may incorporate. The use of an open set provides a means to incorporate information that is provided after the initial source material was created and ingested.

For example, if a communication space is based on the discussion of a scientific nature, e.g., the occurrence of a new form of virus, an open set approach can enable the addition of new information, some of which may contradict or significantly vary within a set of comments, and conclusions from the commentary.

Dimension Reduction

When deploying a system such as the one described herein, where massive amounts of data can be collected and stored from disparate sources, it is necessary to perform an assortment of optimizations so that the system can operate efficiently and without performance degradation.

In some embodiments, each piece of content can result in myriad data records, each created by one or more analysis methods (e.g., image analysis, text transcription, speaker identification, keyword spotting, etc.) that are part of the system's input processes. Each comment, and comments on comments, can also generate myriad records, with an assortment of data values, dependent on how that comment made its way to being queued up for storage in our topologies.

In some embodiments the system's input processes can act on the incoming data to identify, extract, redact, delete, or in other manners act upon this incoming set to reduce the amount of data stored in a repository. One challenge is identifying which of those data sets can be removed from the incoming information sets without adversely affecting the ability of the system to operate effectively and efficiently.

In a topological representation, data records can result in dimensions being added. While this can be needed for completeness, it often results in undesirable demands for storage and can impact detrimentally query and other system performance. In general, there are two broad methods that can be used to mitigate these performance reductions: 1) feature selection and 2) dimensionality reduction.

Feature Selection

Feature selection, for example, can be used to identify a data attribute where the value is the same to all the incoming data records. If this is the case, that attribute has limited value, and can either be eliminated altogether or be stored as a constant across all records.

A refinement of this method can identify attributes where their values have small or negligible variations across a subset of the data, for example is the mean deviation is within a small range, such as plus/minus 2%, then these attributes may be eliminated or stored as a constant. This may include a metric for the range of variation. For example, in a lengthy conversation spanning a long time period with multiple commentators, this may have been parsed by the system's input processes into topic centered segments using NLP, computational linguistics, and the like. Each of these segments may then be formalized as a topology, which in turn can then be evaluated using feature selection techniques to identify those attribute sets that are have the same values within that segment. For example, if many of the comments are "likes", "thumbs up", "Agree" or other indicia of agreement, those comments can be tabulated for frequency analysis, but be removed as features to be stored in the topology.

Feature selection techniques can be systematized, using processes such as low variance filtering, high correlation filtering, and others that can be configured and deployed by the system's input processes. A variety of further techniques exist to systematically identify data to be retained. These include methods to assess the importance of the data in creating robust representations from the data, for example ranking, ordering, prioritizing and the like. The system's input processes may be configured such that at least one of these techniques is employed to evaluate the incoming information stream to identify which of the data record, and their characteristics are essential to that information sets retraining integrity and accurate representation of the information conveyed. For example, an information set may include ten attribute value pairs, and each of these may be removed to establish the underlying viability of the remaining information set. Conversely, such attribute value pairs may be evaluated to ascertain the degree to which their inclusion affects the predictive capabilities of that data set.

The data sets having been processed by the system's input processes, using for example the mentioned feature selection techniques, can then be stored in an appropriate topological representation. The selection of this representation can be configured manually or automatically.

The resulting information sets can then represented as part of a topology, where further analyses can be used to identify ways that the dimensions can be collapsed and combined without losing predictive capacity and query result utility. In these cases, the system can provide configuration capabilities to support multiple perspectives, representing a person, group, other system elements and the like, such that appropriate dimensions that correlate highly with one subset of the dimensions, but have a low correlation with others can be identified. In other words, the system can combine similar dimensions, while retaining disparate dimensions. For example, one method available for this purpose is factor analysis.

Through the use of the factor analysis (and potentially other dimension manipulation techniques), underlying structures of communication spaces and/or conversations can be identified. For example, a further refinement of the factor analysis technique can synthesize new dimensions that combine existing data into new data values, expressed as attribute value pairs and/or combined into open and/or closed sets, that represents the structure in a manner that can be configured to meet the desired, intended or in other manners specified outcomes of a person, group or other system element. For example, a topology can have fewer dimensions, but could also be optimized so as present a feature set that is aligned to the specifications of the configuration. Techniques commonly used for this purpose include principal component analysis, independent component analysis, and the like, which can be used to identify patterns in underlying data Topological Projections The separation of the underlying topology from a projection of that topology enables different stakeholders with differing perspectives to configure and create a representation of the information set represented by the underlying topology that suits their purpose.

For example, if a topology has a set of dimensions (N), a projection may be configured to apply at least one dimension reduction method, for example, creating a further dimension set (Y) where Y<N. Conversely the projection may be configured so as to create a new dimension set from the information represented by the topology. The projection may then be transposed into another information organization, such as a further topology, relational database, graph database, linked list, or any other suitable format.

A topology may have any number of representations projected from it, and as such each of these relationships may form a further dimension in the topology. For example, a projection may be created by the system under the direction of a user, where the projection has a certain set of dimensions, and/or organizations thereof, which may be created at a particular time. Projections may retain the relationship with the topology from which they were projected such that if the information set in the topology is updated, such as may occur when a conversation continues over time, the projection will remain in synchronization with those updates.

In some embodiments, the topology may retain information regarding the configuration of the projection, including the events and methods employed for the updating of the projection. This separation of temporal relationships can be used to retain synchronization while avoiding over burdening the system with the need to continuously maintain those temporal relationships. As projections can be configured by a person, group or other system element, these updates and the associated synchronizations may be demand driven, in that when a user, for example, wants to see the state of a conversation, the projection may execute the methods therein and update the representation of that projection to the user. This can be configured to be undertaken as individual events and/or on a chronological sequence.

One aspect of the system is the retention and availability of the processes employed on ingested data in forming the topology, such that a user may configure the system to employ at least one process used on one data set (e.g., a topology or projection), on a further independent data set. In this manner a user may develop a set of configurations and processes, potentially as a projection, that provide users with a set of outcomes which are independent of the underlying communication space and/or conversations thereof.

For example, projections and the processes to generate those projections may be retained and be made available to other users, groups, or system elements, and as such can become communication spaces and/or conversations in their right. This enables additional users (other than the authors) to use and potentially configure these projections for their own purposes (which may not be in alignment with the original authors intentions). Further, these may be used by machine learning algorithms to form the basis of further projections, topologies, and/or other evaluations and analysis of these representations and the underlying information sets therein. This use may be subject to one or more authorization, authentication, and/or access control systems, including the use of cryptography.

In some embodiments, a lattice may be used to represent a projection from a topology. For example, the lattice may be used to express the relationship between general and specific elements. The use of a lattice can enable a user to traverse multiple nodal arrangements in any relationship. For example, a user, machine learning technique or other system element, may rearrange the nodal relationships, such that the nodal relationships could represent a specific user perspective. This can include a single lattice node associated with a single topic. This may also include the use of multiple inheritance, class structures, and other formalisms that enable a lattice structure to represent a communication space in a manner that can be traversed by a user, for example on a mobile device, where processing and render capabilities are limited.

In some embodiments a lattice which represents an overview of a communication space can be used to form a projection that represents a community view of the relationships in a particular communication space.

In some embodiments, the lattice representing the projection the topology of a communication space may be declared or configured to be closed, such that additional information cannot be added to the topology. For example, a community of users can determine that a projection is a closed topic set.

In some configurations, a user may instantiate a personal projection represented by a lattice, and as such may be able to organize the nodes of such a lattice in any arrangement.

In some configurations the system can use a weighting schema for any set of nodes, such that with the use of such weighting schemas a set of nodes may be presented to a user, where the weights associated with the nodes represent that specific user's perspective in relation to the nodes of the lattice. For example if the nodes are metrices between 1 and 100, a user may select to only see those above 80, or those between 10 and 90, or any other weighting they choose. The weightings may be in the form of integers or fractions thereof (including negative numbers or any other number line representation), characters and/or may in the form of an array, set or other algorithmic construct.

In some configurations a lattice may be used to span multiple devices of multiple users, effectively creating a set of nodal relationships between those devices and/or users through sharing of a common projection as represented by a lattice. This can, for example, be used as an approach for deploying and managing at least one workflow associated with the lattice. For example, this could be undertaken on a dynamic basis as each of the commentary threads evolves.

In many cases the projection will be a reduced set of information that can then undergo further processing to produce the results that meet the specifications of the creator of that projection. In some embodiments this may include processing using machine learning and other supervised and/or unsupervised classifiers to produce predictive projections based on an underlying topology.

This may include at least one projection that has a consistent relationship to an underlying topology, where when the topology information set varies over time as new information is added to the topology, the projection also varies over time. In instances where the projection is predictive, the delta between the previous instantiations of the projection and the updated version may be compared to one another to create a further projection. This may also be the case where a projection is created at a point in time, To, and then the topology varies over time, such that at Ti a new projection is created which incorporates the variations in the topology, and as such represents a further prediction. The variations between the original predictions and the updated predictions may be used as a feedback mechanism with the underlying machine learning and probability analysis able to further refine the predictions by optimizing, varying, or otherwise changing the predictive processes.

A projection may undergo further transformation so as to be instantiated as an API (Application Programming Interface) representing the underlying information and organization of that information.

In some embodiments a number of dimension-reduction techniques based on projections of the topology can be configured and deployed. Some of these techniques can have a geometric interpretation that makes them particularly effective at visualizing structure in the data, which is useful in representing conversational domains to the users of the present system. The different techniques in this category, including ISOMAP, UMAP (Uniform Manifold Approximation and Projection), and t-SNE (t-distributed stochastic neighbor embedding) have different strengths and weaknesses in terms of the datasets they work best on and the types of regularities in the data that they reveal. The choice of deployment may be based, at least in part, on the interpretation of the results by the user, group, or other system element configuring and deploying these techniques.

Which one is better at particular stages of representing the activity around a particular conversation is a matter of community and personal preference, as well as an implementation choice for particular deployments of the system described herein.

Embodiments of the system presented in this document may require a variety of configurable system elements to operate effectively for a particular set of information that a user, group, or other system element may wish to evaluate and analyze.

Output

The system's output processes can be configured to present the system information in a manner determined as appropriate by one or more users. This can include the use of any set of techniques that can be employed in the system as a whole, for example configuration of the system's input processes, the storage and information management processes (including using at least one repository), topology projection and/or other data manipulation techniques (including feature and/or dimension management).

In some embodiments, the system's output processes can provide a set of tools that can be configured and deployed on the available data sets, and may include such functions as (but not limited to) temporal, canonical, statistical, frequency, priority, weighting, identity specific, term based, sentiment, syntactic, and the like. These tools may be organized into sets that may be then be customized to meet a particular perspective of a user and/or group thereof. For example, a user may configure such tools to identify and present the key terms from the most frequent comments within the time scale of this commentary. In another example, the system may identify and represent a trend line for a series of comments expressed over a time period. For example, if a particular content segment generates initially negative comments, followed by neutral comments, and then finally positive comments, these changes may be represented as a dimension, such as sentiment, with each significant term within the particular content segment represented. In this manner the sentiment and the terms used to express such sentiment may be represented.

In some embodiments, a user can configure the system, and the tools therein, to navigate any communication space and/or conversation thereof that is represented in the system. This representation of the information sets and the specified navigation strategies can be configured to meet the user's purpose. Such configuration sets can be deployed on communication spaces and/or conversations other than the original communication spaces/conversations for which such configuration was created. These configurations may also be made available to other users, and may also be used as frameworks for instructing appropriate machine learning techniques.

For example, at least one content segment in any arrangement may have multiple comments, including comments on comments. A user may configure the system to navigate the resulting communication space/conversation via methods such as: a chronological perspective; a topic based navigation; based on an ontology or taxonomy; a sentiment based navigation; a navigation based on a thesaurus, dictionary or encyclopedia approach; navigation based on identity such as a user, a publisher, a distributor, etc.; navigation using at least one metric, such as frequency, weighting, priority, periodicity, and the like in any combination.

Such navigations may form part of the new media type and as such may then become a content segment which may be navigated through such techniques. As the navigation techniques have integrated metrics, a subsequent user may follow the path of a previous user who has, from the perspective of a subsequent user, undertaken a successful navigation of the content. This may also apply where the navigation path is an aggregation of a number of previous users' navigations, representing the collective group path for a segment of content. In this manner a well-trodden path may emerge which is a representation of an optimum navigation strategy for at least one content segment as understood by a wide population of users. Such a population may be self-identifying and/or share at least one common attribute.

When a user expresses the degree of engagement they have with a specific comment and/or on a particular content, the system can record how that comment aligns with the associated content. The alignment of users with content, comments, and comments on comments, in the new media type provides both the creators of those alignments and those who navigate those alignments with a nuanced approach to self-selection and/or representation of their individual perspective. For example, a user may create or interact with (e.g., navigate to) content where they may then contribute to the content. In this manner the new media type can integrate the inputs of such a user, for example up/down votes, links, comments, audio, video, etc. Such inputs may be retained by the user for their personal use. Alternatively, such inputs can be contributed to the communication space and/or conversations which are available to a wider group.

Predictive

In some embodiments, commentary for any content, including an event and/or additional content, may be simulated by the system in anticipation of the actual commentary being published on one or more distribution channels of such content. This may be useful to the content creator in focusing the content to create to predict the results that the content may have. For example, if the intention of the content publisher is to promote, refute, or in other manner project a point of view, the author may tune the content in light of the commentary that has responded (positively or negatively) to similar content. This can be undertaken through the use of the system metrics, where previous commentary that matches a set of similarity characteristics, to estimate outcomes and provide probability analytics that can be used to vary the proposed content and/or commentary. This similarity between a proposed comment and previous comments can be determined by user or by the system using proprietary or third party predictive systems (such as machine learning systems). One possible use of such a feature is the targeting of commentary, including ConC, for differing audiences.

Figure 8:
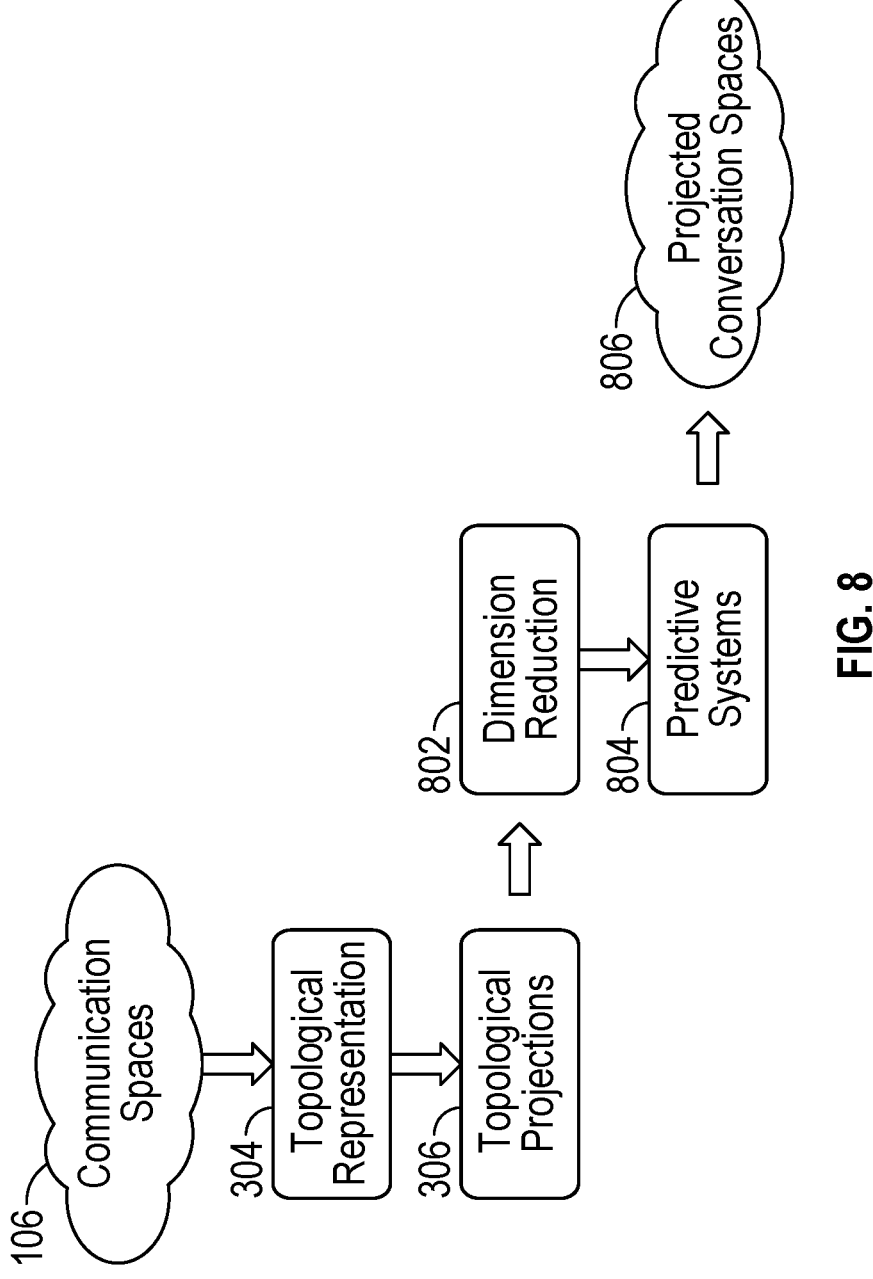
FIG. 8 illustrates an example of predictive conversation spaces.

FIG. 8 illustrates an example of predictive systems 804 creating a projected conversations space 806 based, at least in part on predictive analyses 804 of a conversation space 106 and incorporating the use of topological representations 304 and projections 306, in combination with dimension reduction processes 802.

Gamification may be used both to represent the outcomes of predictive operations and to create a model of the publication of a new content item on at least one distribution channel, so as to create a gamified version of what may occur, based in part on the metrics of previously published content that has a proxy relationship, where such relationship may be expressed as an expression. This may include the use of such techniques as game theory where, for example, previous content and commentary may be evaluated to determine if there is a Nash equilibrium or other facets that can be used as corollaries or comparisons to provide predictive analytics. Users, including groups of users may form part of the gamification framework. For example, a well-understood demographic may be the target audience, or the group that is most likely to engage with commentary.

This can include, in some embodiments, game processes which can be instantiated as part of the navigation and exploration processes of the system. In this way a user may be able to manipulate the controls of such a game processes to play out, over a predicted timeline, the content, commentary, and other modelled factors within the framework and configuration of the game processes. For example, the game processes may present the information set in the form of a topology, with a set of dimensions that enables a user to interact with the one or more landscapes created by the game processes, such that they can, for example, identify and manipulate content and/or commentary, creating new topologies that represent those information structures.

One aspect of the system is the capability to couple the configuration of system tools to undertake predictive analysis, including probability based and machine learning techniques. This can include a range of outcomes, for communication spaces and/or conversations, including:

Predicting predicates required

Predicting likely outcomes

Comparing an existing communication space and/or conversation with another, including one that is proposed.

Predicting likely commentary for a content segment based, in part on comparisons with similar content and commentary Simulation of potential likely outcomes and commentary trajectories.

A further set of predictive capabilities focus on the topics in a communication space and/or conversation, whereby the commentary may be used to identify and navigate to other resources not in the original source material, yet may be important to that discussion. For example, if there is a well-known salient fact that has not been included in the discussion, this may be included. In a manner similar to a page search algorithm, if there are sufficient references to a topic (such as water is $H_2O$), then a reference/link to this may be inserted by the system to one of those resources. For example, if there is much discussion regarding the death of Elvis, links to the date and coroner's report may be inserted. The system may use recognized experts, recognized education sources, search criteria, and/or other commentary streams to identify what information is absent within a given communication space/conversation. This may be the case when the assumed knowledge of the audience does not match their actual knowledge.

Figure 9:
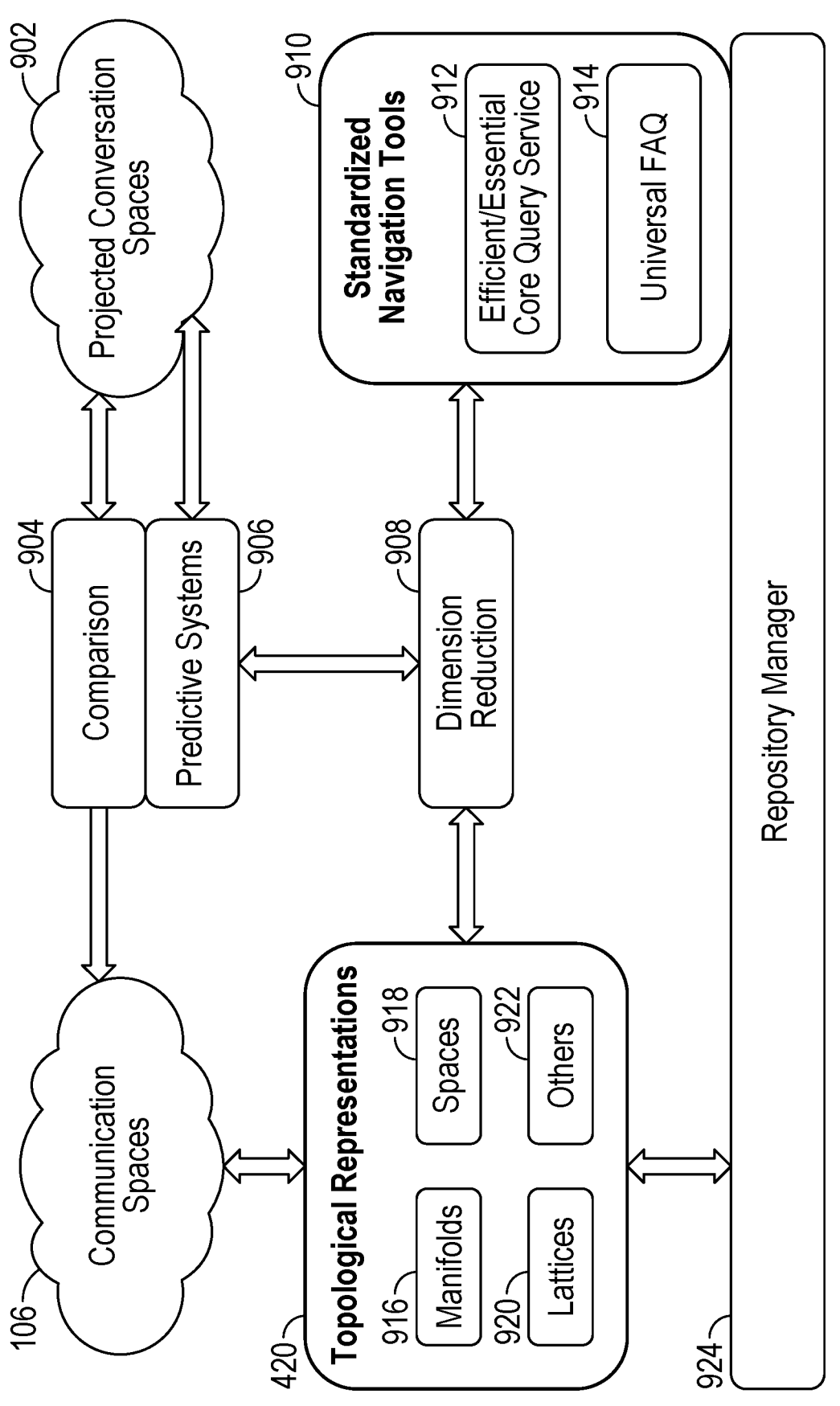
FIG. 9 illustrates an example of dimension reduction.

FIG. 9 illustrates an example of predictive conversation spaces, which when compared with the evolving conversations occurring may be used to enhance the predictive capabilities. This can include the use of dimension reduction 908 techniques and/or predictive systems 906 to create universal FAQ 914 (Frequently Asked Questions) and core query services 912 (as part of standardized navigation tools 910) to address most common and/or commented questions. As the system compares 904 current communication spaces 106 with projected conversation spaces 902, the predictive systems 906 can identify, based on the comparison 904, how the spaces 106, 902 are likely evolve over time. This can cause dimension reduction 908 within the existing topologies 420 (including the manifolds 916, spaces 918, lattices 920, and others 922), as managed by the repository manager 924. In some configurations, this dimension reduction 908 based on the current topologies and the comparison 904 can result in the creation of additional topologies 420 which can be stored by the system.

In one embodiment, an analysis of a content segment and commentary thereof may produce an outcome that, from the perspective of a user or group thereof, is considered to be satisfactory to a high degree. This could take the form of a projection and underlying repository, which may then be subjected to a series of predictive techniques, leading to a deeper understanding of the dynamics of content and commentary. For example, Bayesian predictive methods may be applied to the information set to create a projected commentary based at least in part on the commentary related to the content and/or commentary of differing content that exhibits similar characteristics. For example, a group of stakeholders in a conversation may wish to influence or counter influence other stakeholders through the expression of commentary. The use of system metrics, such as velocity and acceleration as pertaining to at least one topic may be used to evaluate the potential impact of a topic, expression, opinion, or other comment. For example if the commentary on a conversation is focused on diet, the introduction in the commentary of fertilizers may impact the commentary from a positive to negative sentiment. The use of such predictive techniques may enable a user or group thereof to predict and/or understand the likely trajectory of commentary. This may then be applied to a further independent content segment, and can lead to at least one interested party making commentary that mimics the metrics of the segment under study. In this manner predictive outcomes can be both modelled and undertaken to the potential advantage of those undertaking the analysis. For example, such techniques can be deployed in product marketing, audience research, scientific, and other research and the like.

Figure 10:
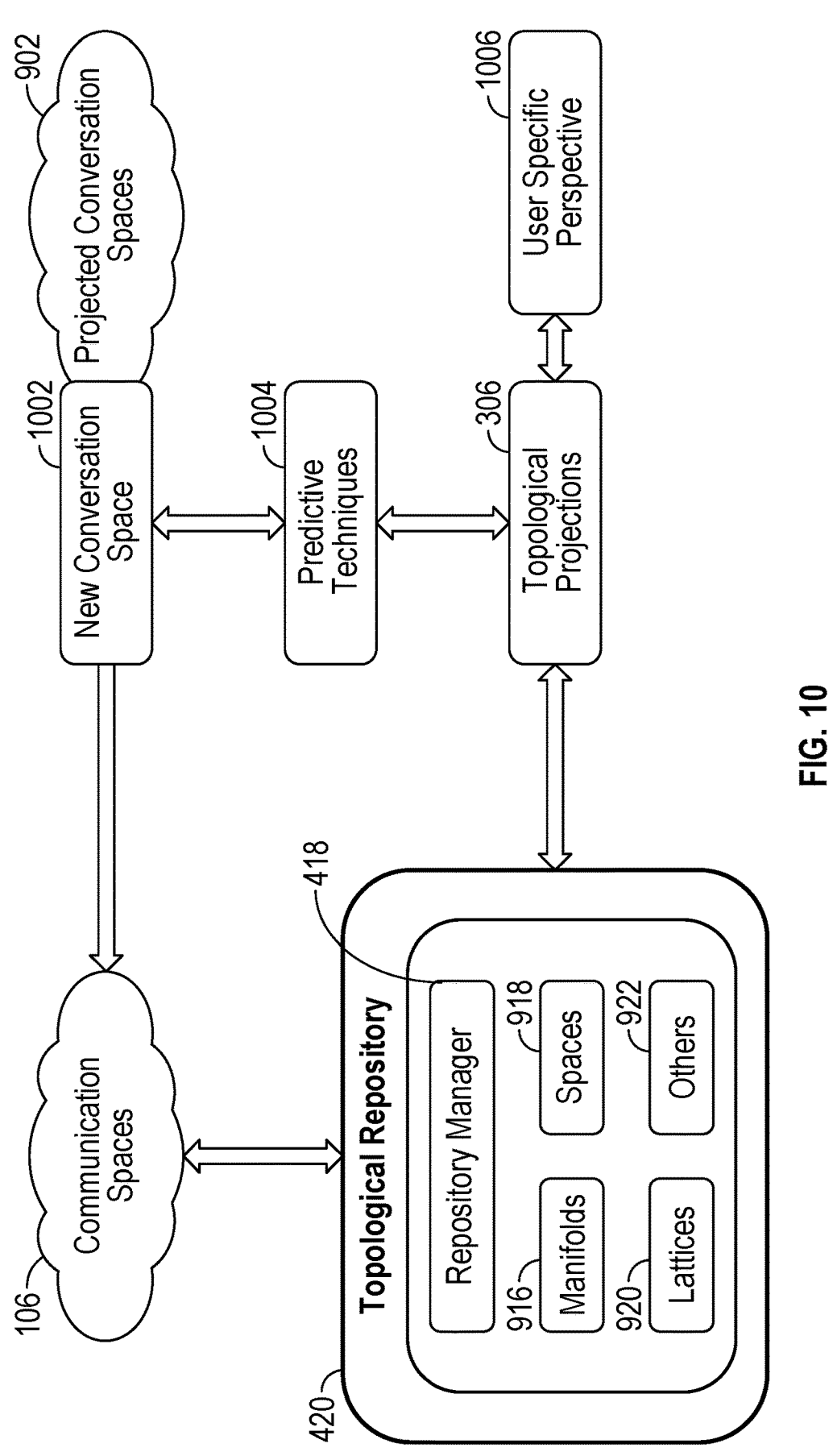
FIG. 10 illustrates an example of projected conversation spaces.

FIG. 10 illustrates an example of a project new conversation space 902 using predictive techniques 1004, such as for example a conversation space that represents an agreed community perspective. As disclosed herein, a communication space 106 can be converted into a topology and stored within a topological repository 420, with different types of topologies stored within a topological repository 420 and managed by a repository manager 418. These different types of topologies can include manifolds 916, spaces 918, lattices 920, and others 922. Based on the user specific perspective 1006, the system can create topological projections 306. The system, using predictive techniques 1004 (such as, but not limited to, machine learning), and then predict how a new conversation space 1002 will form based on agreements between the user specific perspective 1006 and the perspectives of other users. This can result in the projected conversation space 902, and can be used to modify the current communication space 106.

In some embodiment existing ontologies and taxonomies may be used to evaluate commentary, providing a framework for machine learning classifiers, so as to rate the relative relevance and other characteristics of at least one comment. This can include sets of comments, many of which may not have been made sequentially or by a single author.

These ontologies and taxonomies may also be used to identify the sets of information, including definitions, that may be required for an effective discourse. If, for example, the ontology/taxonomy exists, then the comment stream under evaluation can be matched and omissions identified. This can also be case where a comment stream (e.g., how to fix your dishwasher) is well regarded (as expressed by comments) and may be used as a reference for another comment stream on same/similar topic. For example, if an essential element for the discourse on a chemical compound, the well understood chemical processes may be required as port of the discourse. In some embodiments, such information sets may be added to the communication space and/or conversation. The impact of this information on the commentary may be measured and evaluated.

One aspect of the system is the capability of determining the operation of bots or other automations in generation, tracking, monitoring or in other ways impacting commentary, both actively and passively. The system may deploy such automatons to ingest commentary. The system's predictive processes may simulate a commentary set that matches an algorithm, including an intended output, and identify those commentaries that match, in whole or in part, such commentary.

Topologies may be indicative of the depth and breadth of a conversation or communication space. This may be evidence by the dimensions of such topology as well as the feature sets. For example, if there is a dimension with an axis of agreement/disagreement and the distribution of the comments is highly polarized, that is based on the two end points of the dimension, the conversation is highly divisive and unlikely to reach a consensus outcome.

The mapping function processes the content materials into at least one form suitable for representation as a topology. The topological representations function provides an interactive capability for the new media type to be available to the other system elements. This can support the dynamic representation of the new media type, for example when the activity on or for that content is occurring in real or near real time.

The topological projection function can process the topological representations into at least one projection that can be rendered by an application and/or appropriate render engine, such that a user or their proxy may interact with such a projection.

Getting from a topology to a representation that is beneficial for users can involve differing analytic processing.

For example, if a user chooses a particular video as the content focus of their user interface representation, they can be presented with any arrangement of the comments, regardless of media type. For example, these can be arrayed along a timeline/controller for a video clip. Each of the top-level comments, that is comments referencing the content of the video clip, can be associated with a particular temporal event or interval in that video content. This representation can involve finding neighbors of the original video in the topological representation, filtered by direct connection to the original video.

When represented to a user, further refinements may be applied to create a more informative and useful user experience. The commentary may have an altered visual appearance, based on appropriate metrics, changing color, size, font, and/or other attributes to draw attention to commentary items that have more relevance, as determined by the user and/or system configuration of that representation. The representation may change in appearance and function, based on triggers, thresholds, events or other selected, declared or system invoked attributes, such as for example, upvotes and downvotes, recency, number of views, status of commentary author, and/or other characteristics.

As the system can retain a history of each user's behavior, this may form a type of commentary. This enables the system to include previous behavior in a rendition for a user experience (e.g., showing already-viewed commentary) as well as predictions for a user (e.g., highlighting new material from an oft-watched commentator and the like).

The use of topologies and projections enable the system to support any user experiences based on the system capabilities in any arrangement. Current systems limit the users experiences based on the format of the repository and the limited user interaction operations, often determined by the schemas employed by those repositories. This is particularly the case where the main index for the content and commentary is temporal, that is a timeline based. This is exacerbated when the content and commentary are asynchronous in their representation. The system navigation and exploration tools provided by the system allow the user and/or system to modify how content and commentary are displayed, often removing the temporal aspects and instead focusing on topic, effect, and/or interests.

The flexibility of the system involves the use of n dimensional topologies as repositories. These may then have at least one retrieval system operating upon them. For example the projection capabilities of the navigation and exploration tools, which may be configured to provide any rendering of the information sets in any arrangement supported by the render device. This flexibility enables the user to create a specific perspective that supports their intentions and purpose and persist that representation for later use. In some embodiments these retained representations may be published on a system wide basis and/or to a selected user group.

For example, the comments on comments can be positioned near the initial set of comments or aligned on a temporal basis as determined by the user and/or system. For example, a possible representation for a user is to nest the initial timeline representation with further timeline fragments for the comments on comments. This is a new form of content, described herein as the new media type, and can be traversed in a variety of trajectories, including breadth-first and/or depth-first.

For example, commentary that defines terms, explains concepts, provides context or in other ways provides clarity from the perspective of the commentator or user, may be integrated as part of the new media type. Some sets of users may want to have such comments as part of the conversation and communication space such they form part of the temporally linear experience of that new media type that such a user is experiencing. There may be further comments that expand or extend content or commentary including earlier submissions.

For example, some commentary may contradict at least one other comment or content, and as such may, in whole or part, aid at least one user in developing a deeper and potentially more nuanced understanding of the content, commentary and context, expressed as a communication space and the conversations therein.

Assembling these submissions into differing priorities, ordering, ranking, scoring or other arrangements, can be facilitated by different projections from a topology. In this manner, a community which has developed around a communication space and the conversations therein, can benefit through the configuration of the information set including this communication space and conversations, to meet the specifications, organizations, arrangements or other informing principles expressed by that community in pursuit of their collective or individual purposes. For example, the representation of this information may be in the form of a meta-review of the communication space, such as, for example, a research area, educational topic, specific domain and the like, creating a new valuable resource for that community, that hitherto has not existed, that can include a unique synthesis of individual contributions, including content and commentary.

Such a community may include users who self-identify as experts in the domain represented by the communication space of that community. Such assertions may be complimented by third party validations, such as published and authenticated qualifications and the like. In some embodiments there may be rating systems that accrue reputation information for users, based in part on their behavior, which may include sets of metrics as described herein and standard scoring such as likes, views, and the like. This information may be integrated into the user experience and may be derived from and/or be part of at least one topological dimension, the projection(s) thereof in differing representations, including those selected by users, their proxies and/or the system.

For example, this new media type may be configured and represented in a tailored UI (User Interface) that emphasizes the information a particular user selects, either directly or indirectly, and may deemphasize or remove other information that the user, their proxy or the system selects.

Examples and Use Cases

Consider an instance of how a radio or TV broadcast of a discussion of modern philosophy and current events might serve as the initial thread of a conceptual and discursive network of discussions and debates. Rather than a one-way transmission, the system broadcast media shifts into an inclusive and participatory media consumption system.

Context

For example, the stars of a popular broadcast radio or TV show create periodic programs discussing topics of popular interest as viewed through the lens of the discipline of philosophy. The TV or radio show has a regular set of viewers and listeners, collectively the initial audience, as well as a number of drop-ins who don't typically follow the show, but who happen to have heard it. The show is typically broadcast at a particular time for each of the stations that carry it, and in some cases may repeat several times on the same station. Due to strict limits on broadcast time, often the shows and/or the individual segments thereof are very economical in their content (say, no more than six minutes), and can often leave the listening audience wanting more.

In this example, there is a website or other internet presence that is associated with the show, which includes an archive of earlier programs, biographies of the participants, links to related books, other references, further program specific details, and the like. This may include, previously broadcast shows that are archived as well as videos, which can include footage of the hosts in the recording studio. There may also be other resources that provide further information on the topic, that are refenced or embedded by commentators. There may also be additional comments and/or navigational aids that are provided by the original authors of the content and/or their proxies, such as the broadcasters, where such additional references are rated as to their alignment, accuracy, reliability, and like to the information conveyed in the original broadcast.

In one example embodiment, a consumer user on the website can see the video in a window of their computer system, looking not radically different than an offering from any other video delivery system. For example, when a user directs their attention to such a window, using the interface capabilities at their disposal, the window can present at least one timeline for the user to engage with. This can include a progress indicator, in this embodiment being a rectangle that fills as the video plays. The user has an unencumbered video screen whenever they are simply watching, and a video controller when they exhibit interest (e.g., by trackpad movement).

However, the system navigation tools for the system as disclosed herein may include the capability for a user use a set of pointers for specific temporal, topic focused, comment centric, and/or metric driven locations and/or intervals in the video, which support the user finding areas of specific interest. For example, the user can be provided solid polygonal arrows with appropriate text embedded and/or included by reference to specific portions of the video content. Such indicators can be generated, for example, using one or more navigation and exploration tools, by analyzing the audio of the radio show, transforming the transcript into phrases, and configuring them as playback indicators. These playback indicators may be topic centered, comment centered, semantic driven, metric driven, user (including other users) selected, system generated, reference aligned, etc.

In addition to these temporal indicators, for example presented as transcription markers, other navigation identifiers can be represented as indicators on the timeline. When these indicators are acted upon, they can result in an overlay of further content that has been bound to the video material being viewed. For example, this may include a pop-up within the window, as a pop-out near the window, or as an embedded overlay and/or the like. These additional content elements can be contributed by, for example, other users of the system, including the original creators and/or by other members of the community, user sets, etc. Alternatively the additional content can be system generated based on determinations of relevant content.

Such additional new content overlays can be any one of many, and possibly a composite of several, media types, for example, text, image, video, audio, web pages, and the like. These can then be used to expand, extend, enhance and/or explain the subject matter at/near at least one particular point and/or interval in the playback. The system might provide a definition for particular terminology, a link to a research paper, a biography of a mentioned individual and/or an annotated bibliography, and the like, which may be supplied by any user in the community and/or system generated. For example, some of the material could be out-takes from the original shoot, anchored to moments in the edited-together radio show. In this instance, the present invention results in what could be considered, for example, a "Director's Cut" of the radio show.

As a viewer, a user can add their own comments and overlays, in any of the media types supported by the system. For example, if a user is an expert on one topic that is discussed or presented during the radio program, they may focus their interactions on the details relating to their specific, and in some cases extremely narrow, topic of interest. Just as easily, such a user may pose a question, which may be in the form of a comment. This may then be addressed by any of the original discussants or any other interested party in any arrangement.

In this example, the material about the topic of a 5-minute radio piece can expand and extend, possibly including material that was edited from the original presentation, where that cut material provides background, context, or other aspects on the topic under discussion. This added detail can be provided by everyone from a philosophy professor from another institution, to a frequent viewer and armchair expert, to a curious student who is still learning about the topic.

A user may interact with content, through for example a topological representation of the content, such as a communication space and/or conversations therein. This can include projections of those topologies that can be configured to meet the specifications of the user and/or may be generated by the system in any arrangement. Such an approach supports multiple points of entry, engagement and/or interaction with such content representations, for example a user may have discovered the specific content using well known search techniques, through references provided by other users, through use of the system navigation and exploration tools and other methods for content discovery. For example, a point of entry for a specific user who is new to the topic of how philosophy has relevance to contemporary life, can be configured, for example by a teacher, the system, a user group (including another user) and the like. Their entry point may be a question, such as "how does philosophy matter to me?" Based on their question, their browsing background, their education, and their previously-viewed material, and the like, the system may configure an entirely-novel set of content and overlays, formatted as the new media type, to address their question. For example, one or more of the included content might come from the radio show that was being discussed here, but it might be arranged, and augmented by other content from other sources, such as other content and/or commentary and/or the like. In addition, users can declare education/ qualifications (both formal and informal) in their profile as part of their identity, and the system may use their profile with the user's commentary, viewing habits, commentary repository, etc. (only with the user's permission) to determine potential representations which can be customized to the user.

With the system supporting any user contribution, through for example, comments, and comment on comments, the degree of complexity and depth of these contributions is addressed by the use of the underlying multi-dimensional topologies representing such information repositories. This is supported, though the use of flexible metrics aligned to the multiple dimensions ranging from the simple upvoting and downvoting paradigm to more sophisticated metrics, involving the use of machine learning and other system assistance techniques in combination with recognized and authenticated expertise of one or more contributors and/or refence systems. This can be presented in differing representations with those aspects deemed, through interaction and/or declaration as important topics become larger and more detailed, while those attracting less interest can be presented as fading into the background.

Users and algorithms can aggregate content and comments in the new media type. Users, both individually and collectively, both expert and amateur, can put together tours of the content. A particular expert might be someone to "follow," not in the social media sense of wanting to be notified of their posting, but to actually track, monitor, and engage with their traversals of the potentially vast material contained in the systems repositories, including topologies, communication spaces and conversations. Further, a user can let the wisdom of the crowd provide the navigation and exploration at least one axis for them to traverse the material in ways that have been determined by the crowd to be popular. This may include multiple axis, which are in part determined by age, education, background, history, politics, beliefs, preferences, and/or the like.

If a user wants to remain involved in a particular conversation about a content element, a topic, or other aspect, the system can provide a comprehensive, configurable event and alert management capability which such a user may invoke. For a sparsely-trafficked territory/topic, this might resolve to individual postings, whereas for more active topics, the system navigation and exploration tools can provide and configure algorithms that can be deployed. For example, this can include identifying points of maximum change in the topic topologies they're interested in, for example using metrics such as velocity and acceleration.

The system can support a massive collection of multimedia content and commentary, debate, clarifications, and rankings, performed by a mixture of algorithms and invested humans, make an evergreen and ever-expanding knowledge base that tailors itself for individuals and particular uses.

Another application domain for the present invention are how-to tutorials. This is a popular genre on the internet, but it is also one of the most problematic, exhibiting myriad issues that the system described herein directly addresses.

For example, a how-to video for cooking a particular item or dish, is often based on assumptions, made by the author, that the techniques described in such a video are widely understood and accepted. Generally such how to videos have an implicit or explicit target audience with an inferred or declared level of expertise in the domain under discussion. This can become problematic because, for example, expert cooks may go into excessive detail, and at the other end of the scale, beginners may be left mystified by particular steps. Some people may lack critical equipment, others may not possess some ingredient, others still may want to prepare a variant, or want to know how long the dish can be held at certain moments during preparation. The system, using the new media type format, can provide content that is identified and formatted for the intended audience level of expertise or other characteristics.

For example, the version for a provide may include a set of references that explain basic cooking techniques employed in the instructions. These techniques may not have been described by the original author, but have been integrated by other users and/or the system in any combination. For example, a community may represent that a particular how to video is valuable to that community through, for example, one or more metrics, and/or other commentary such as reviews and the like. In this example, the original content may have added content in the form of additional explanations, variations, detailed or simplified descriptions, sources of ingredients and the like, which have been provided by community members. This assemblage may be created by at least one of that community and/or by the system. The metrics associated with the success of that particular content in satisfying a set of users, may provide a key search element that can be used to identify such content. In some embodiments, this may involve varying degrees of divergence from, for example, ingredient substitution to complete and independent alternative recipes that have a common ingredient, technique, name, author or other characteristic.

For example, the original publishers of such a how to cooking video can, depending in part on how much time they want to put into their authoring efforts, load the playback timeline with indices and other metadata that can assist other users to navigate and explore the content. They can include a preformatted template, for example one that is generally accepted by a community, created by the system and/or selected by at least one user. This can be part of a standardized set of publication criteria that ca be supported by the system, and may provide a structured way for at least one user to interact with the system. The development of such templates, publication criteria and other standardized formats can involve significant effort and resource, however the system tools can provide assistance through the use of machine learning, computational linguistics, and including use of the underlying topology and the dimensions thereof. In some embodiments, projections from these topologies may from standardized methods for such interactions, where such standardization can be based on community commentary and/or system and/or user metrics, declarations and/or other characteristics.

Currently, in many situations, a viewer of an instructional video, may spent a significant amount of time backing up the video to re-watch a step, or trying to figure out what they had missed. The new media type format navigation and exploration tools provide assistance in resolving this situation through the use of rollback, pre-roll, looping, references, multiple windows, structured interactions (for example using time or user input), highlighting, supplementary information sets (such as additional audio, text or video, potentially on multiple devices) and/or the like. The user may be able to select the degree to which they want or need such additional information sets, to avoid overloading the user with information.

In some embodiments, the system may have integrated commercial or other supply capabilities, such that for example, ingredients may be sources form at least one supplier, as described by the how to video. In another how to example, this may occlude sourcing spare parts for a device, access to service personnel, or other materials, both logical and physical, that may be required. The integration of commercial capabilities may, in some embodiments, be determined by the preferences of the user.

One application of the present invention could be to discuss where to purchase ingredients, including specifications of exactly what to purchase. Debates about the even the simplest thing, like the optimal kind of flour to use for this or that bread, can be supported, but so could simple clarifications about names for vegetables (eggplant vs. aubergine, or zucchini vs. courguette) or spices. Typical members of a community also do things like suggest different amounts of particular ingredient. Another application can be to tell people where to purchase particular tools or utensils necessary for making a dish, which can be another source of considerable debate.

Community comments can vary in quality, detail, description, and/or correctness, so enabling the rest of the community rate and comment on the comments, can provide a set of metrics that identify those comments most pertinent to at least one user.

The community can also explain particular steps in the process, like how to use a quick dip into boiling water to loosen the skin on a tomato. Some of these tips will be to well-known methods from cookbooks (although maybe specialized for a given stage of a recipe).

For example, even over a short time, potentially for just a single food item, with an initial recipe, a rich topology can form. Further, related foods, relevant preparation techniques, similar utensils, all may start to be clustered in the topology. Different topological projections can reveal closely-related foods and different recipes for the same item. Other topological projections will reveal different relations, like particular processes shared across recipes. Yet other topological projections will reveal that many cultures share a particular variety of food, like the myriad ravioli that span the globe. For example, upvotes and downvotes can signify interest. Experts can be recognized. Reality shows may form around popular content, comments, authors and the like.

This approach is extendible to a wide range of fields where how-to tutorials currently exist, including for example, home improvement, car repairs, crafts, electronics, programming and the like. Every one of those activities has an assortment of issues that are in some degree similar to the ones exhibited with cooking. For example, building a topology of predicates for the task to be undertaken, such as those required for a specific car repair or a computer programming video that is for an earlier version of the scripting language and the like.

A further aspect of the system is the use of the new media type to create, through the use of a topology and projections thereof a shared-authorship creation (authors, commenting) which extends and expands the aggregated content to a more integrated type of content, which can then be distributed and further evolved through social networks and beyond. As the new media type integrates and aggregates, modulated by any filtering or other rule sets, the interactions of commentators and/or content providers, resulting in the new media type, the new media type as a whole may change in character, composition, and representation based on the perspectives contributed by the content creators and commentators.

Figure 11:
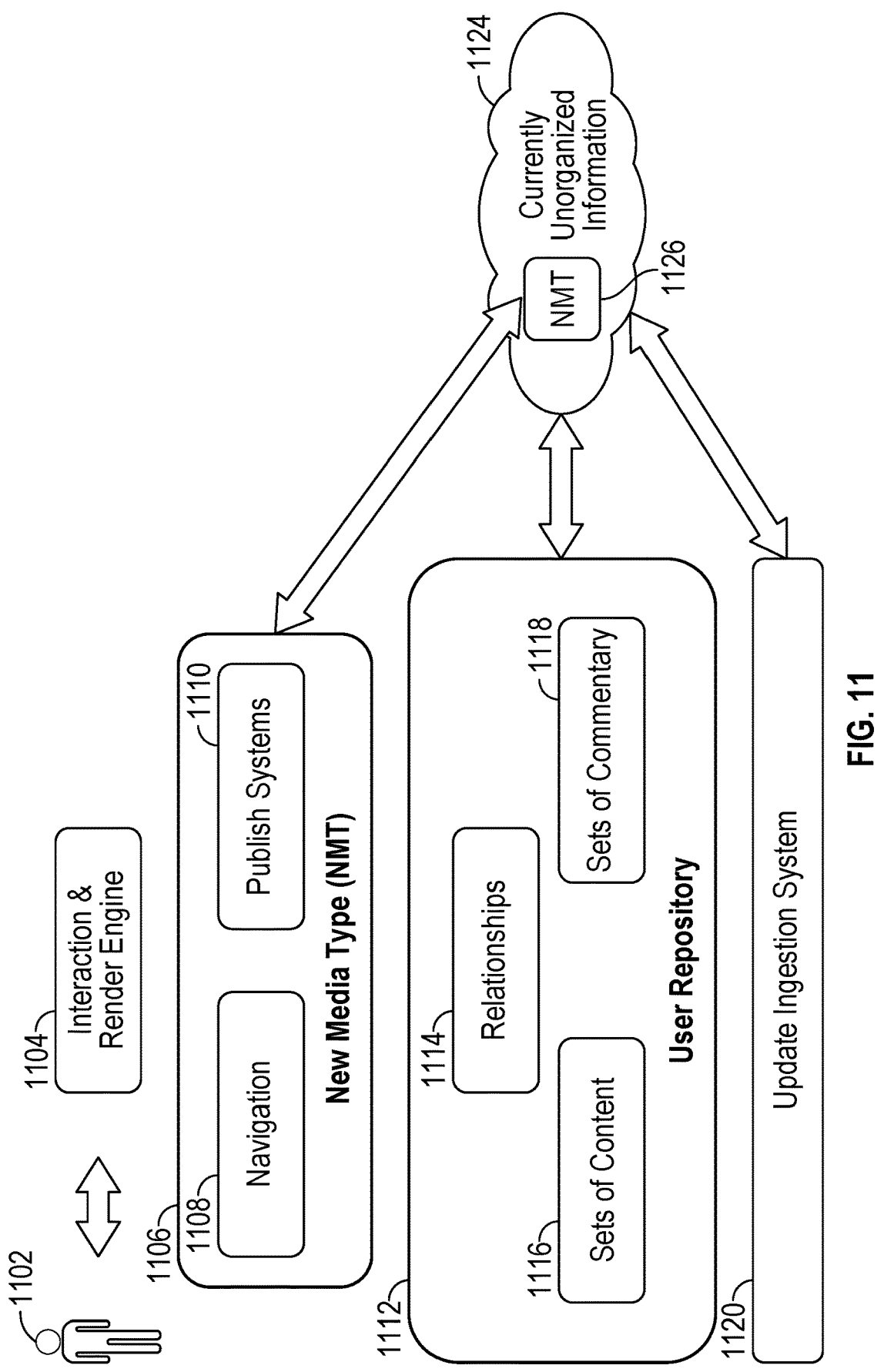
FIG. 11 illustrates an example of a new media type publication.

FIG. 11 illustrates the creation of new media type 1106 content which can then be published to the internet, and may be stored in a repository 1112 both as a complete entity and in the component parts thereof. As unorganized information 1124 is received from the Internet or other sources, the system disclosed herein can ingest that data, forming a new media type (NMT) 1106 with unique navigation 1108 and publication 1110 capabilities which can, through interaction and rendering engines 1104, be used by a user 1102 to more effectively navigate, browse, and search content. Based on how the user 1102 browses, navigates, and searches, the system can store, within the user repository 1112, sets of content 1116, relationships 1114, and sets of commentary 1118 pertinent to the user 1102. The system can also then publish the new media type 1106 information to the Internet, such that the new media type 1126 is available among the unorganized information 1124 as an alternative way of viewing the data.

Individually and as a whole these comments have their own topics, focus, perspective and opinion, which can be metricized through at least one measurement system, potentially in real-time or near real-time. This can involve both manual and automatic processing, using both machine learning and human intervention and curation. Such metrics can act to place ratings on the comments, content and aggregated new media type. This may be in the form of expressions such as scalar ratings, significance, quality, verification, authenticity, authority, and other expressive measures that convey, in one of more dimensions, the importance and potential impact of the new media type.

Such metrics may be created through evaluation of the authorship of the content and commentary, which may be an expression of the influence an author has in a specific domain. This applies to the original authors and/or the authors of the commentary, which may affect the metrics of the new media type, in whole or in part.

The system can support the evolution of ideas and their expression in manner similar to the organic process that happens in a communication space, conversation and/or community, where an idea may gain traction or not with the broad majority, however there can be avid supporters and objectors who have more radicalized perspectives. This is "narrative intelligence," and in some embodiments this may be a metric that is expressed as a simplification of a set of contributing metrics representing the aggregate quality and utility of the new media type material as a narrative. This can be independent of the content itself or the commentary on that content, and it can be a metric of the quality of the discourse expressed in the new media type.

An index or search function within the system can identify (using the narrative intelligence metric) those narrative(s) that offer a discourse that can be considered the most valuable, in terms of depth, time, content, topic, focus, argument, or any other perspective that can be expressed as a dimension in a topology. The authorship of the commentary, in the form of a unique identifier representing a unique identity, which can be bound to the commentary, such that the new media type element that incorporates such commentary can include the aggregate identities of the authors of the content and the commentary. This information may be presented in any arrangement, including as an ontology, taxonomy and as at least one dimension in a topology.

To the extent that the transactions can be published, the participant(s) may become a co-author. When a participant becomes a co-author, this can be represented as a transaction, which in turn can be written to a distributed ledger, such as a blockchain. In some embodiments, the blockchain might include that a participant/co-author can be a recipient of proceeds derived through the distribution of the new media type material. For example, a co-author who shares his/her social network with the content and extends the distribution reach can participate transactionally both by receiving an elevated reputational metric, as well as benefiting commercially, though financial or other appropriate renumeration. This can address the issue of collaboration, cooperation and the potential and actual benefits thereof.

One example of this approach is in financial markets where professional financial analysts comments, consumer commentary, and other information, are aggregated into an appropriate topology from which at least one projection can be created. This can then provide a framework for decisions, forensics, and/or other navigation and exploration processing to be undertaken that meets at least one of the objectives of a user.

Another example is the use of the system in home and consumer entertainment and content delivery, such as Interactive Television and OTT (Over The Top) services, where for example, a streaming service automatically populates its content through user engagement, where the consumer becomes a viewer-participant and is allowed authorship (like in games) where they create and spin narratives among themselves towards a dynamic non-predetermined outcome. When coupled with blockchain this can enable a content clearinghouse where inpoint and outpoints of content can be pushed across disparate networks, including dynamic pricing.

Other domains where the system may be used are education, content management, sports, and/or any tutored activity including cooking and the like. Additional exemplary domains can include automatic meme generation and NFT creation and deployment (for example, markers can become auto NFT generators). Yet additional exemplary domains can include vehicle traffic systems, including autonomous automobiles, where content from vehicles create new media network around travel behaviors and can be grouped with passengers sharing common or similar characteristics.

Figure 12:
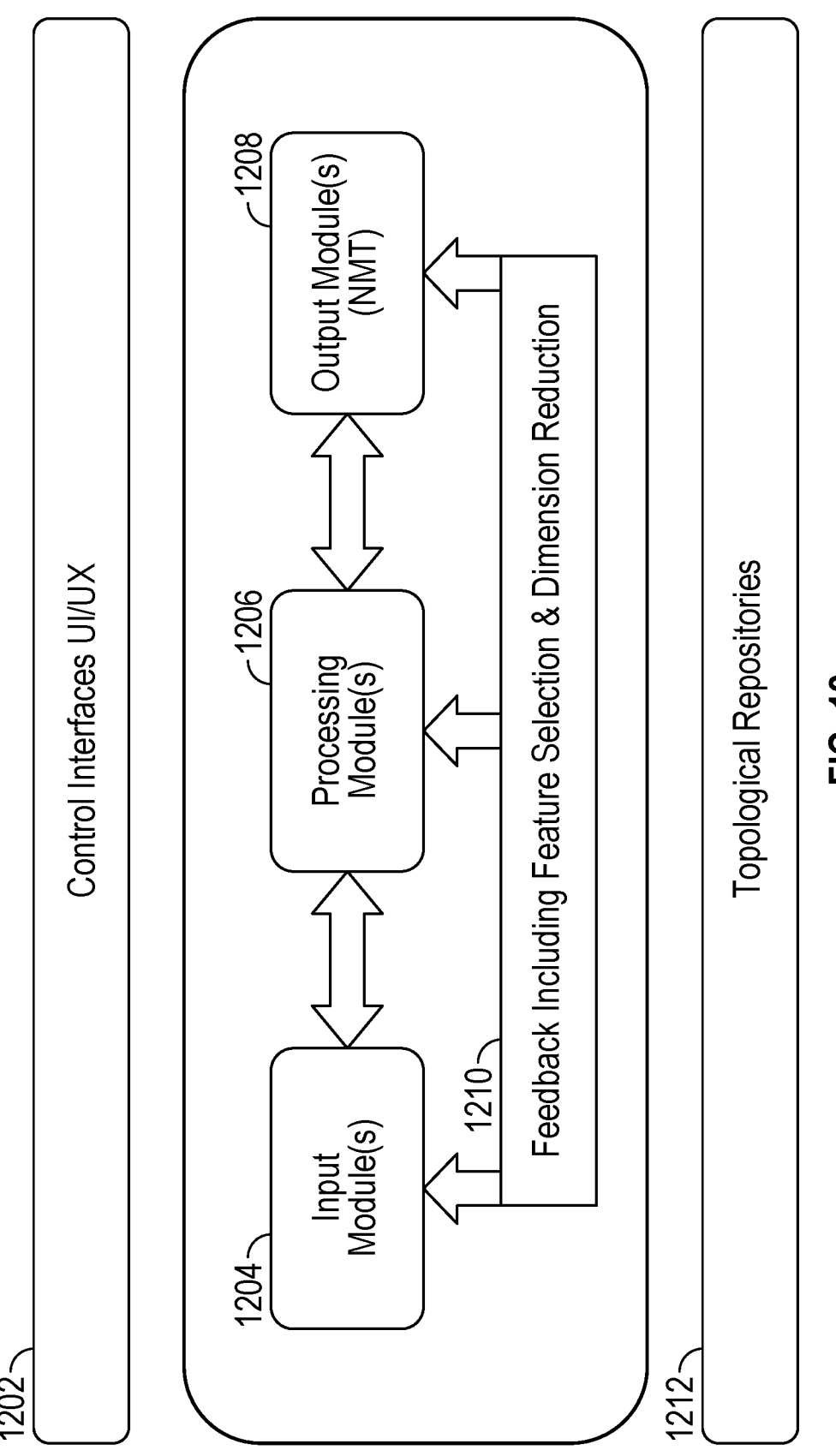
FIG. 12 illustrates an example of modules within the system.

FIG. 12 illustrates a simplified example embodiment. In this exemplary system, the user interacts with a control interface 1202, which passes the inputs provided by the user through the control interface 1202 to an input module 1204. The parsed inputs are passed to a processing module 1206, which can retrieve information from topological repositories 1212 and provide subsets, metrics, or other information to the user through the output module 1208 as a new media type (NMT). As the user provides additional feedback to the system, including feature selection and dimension reduction 1210, the input module 1204 parsing, the processing module 1206, and the output module 1208, can all become more refined in receiving, navigating, processing, and outputting content which corresponds to the user requests.

FIG. 13 illustrates an exemplary method embodiment which can be performed by systems configured as disclosed herein. As illustrated, the method can include: receiving, at a computer system, first content (1302) and, generating, via at least one processor of the computer system, first metadata associated with the first content (1304). The method continues by receiving, at the computer system, second content associated with the first content (1306) and generating, via the at least one processor, second metadata associated with the second content (1308). The method can then include generating, via the at least one processor, a topology representing a relationship between the first content and the second content, the topology having a number of dimensions based at least in part on the first metadata and the second metadata (1310) and comparing, via the at least one processor, the topology, the first metadata, and the second metadata, to previously stored topologies and previously stored metadata, resulting in a comparison (1312). The method can then proceed by executing, via the at least one processor, a machine learning algorithm, wherein input to the machine learning algorithm can include the comparison, and output of the machine learning algorithm can include predicted future changes to the topology (1314) and reducing, via the at least one processor, the number of dimensions within the topology based on the predicted future changes to the topology, resulting in a reduced dimensions topology (1316).

In some configurations, the illustrated method can further include: generating, via the at least one processor and using the reduced dimensions topology, content navigation directions which provide instructions for a user of the computer system to access at least one of the first content, the second content, the first metadata, and the second metadata; and presenting the content navigation directions to the user. In such configurations, the method can also include generating, via the at least one processor, topological media content including: the first content; the second content; the first metadata; the second metadata; and the content navigation directions, wherein the topological media content is self-reliant with regard to content.

In some configurations the illustrated method can further include: identifying, via the at least one processor performing Natural Language Processing, a common topic of the first content and the second content, and training, via the at least one processor, the machine learning algorithm, prior to the executing of the machine learning algorithm, using commentary on the common topic. In such configurations, the method can also include: identifying, via the at least one processor, a conversation space which includes the first content and the second content; predicting, via the at least one processor using the machine learning algorithm, a predicted conversation space, wherein inputs to the machine learning algorithm include the conversation space and the common topic, and wherein outputs of the machine learning algorithm include a new conversation space; and presenting the new conversation space to the user. Such methods can also include: calculating a velocity of new comments being added to the first content and the second content; and calculating a volatility of the new comments, wherein the inputs to the machine learning algorithm further include the velocity and the volatility.

In some configurations, the first content and the second content are different types of media sharing a common topic.

In some configurations, the illustrated method can further include: retrieving, from a repository (such as a database, server, or other computer-readable storage media), a second topology; comparing, via the at least one processor, the topology to the second topology, resulting in a second comparison; identifying, via the at least one processor using the second comparison, at least one common dimension to be removed from the topology and the second topology; and reducing, via the at least one processor executing a common dimension reduction, the at least one common dimension from the topology and the second topology.

In some configurations, the illustrated method can further include: retrieving, from a repository, a second topology; comparing, via the at least one processor, the topology to the second topology, resulting in a second comparison; identifying, via the at least one processor using the second comparison, at least one common dimension; and generating, via the at least one processor, a third topology based on the common dimension. The system can then present that third topology to the user in response to a query, as a suggestion to the user based on past activity, etc.

In some configurations, the at least one machine learning algorithm includes a neural network.

Figure 14:
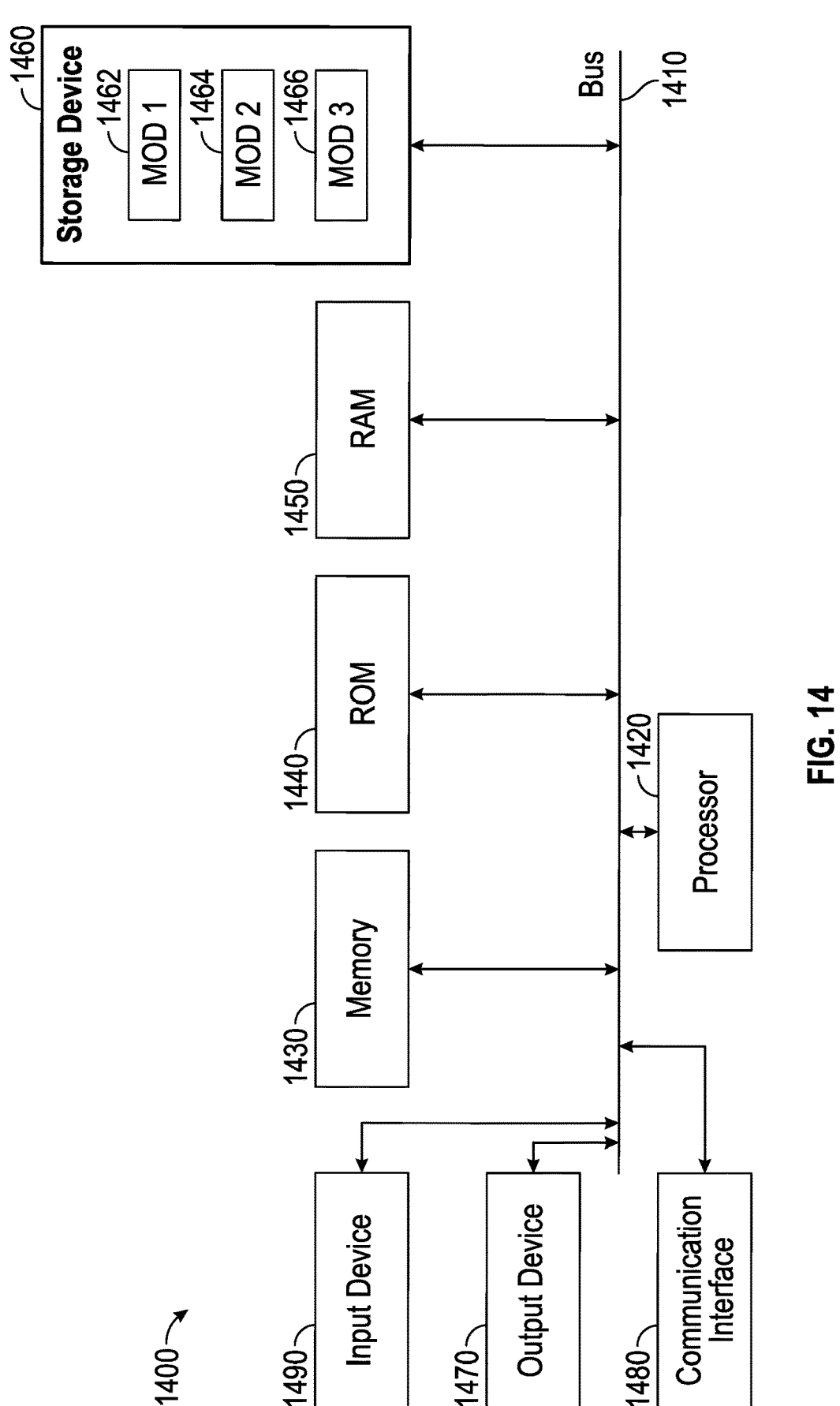
FIG. 14 illustrates an exemplary computer system.

With reference to FIG. 14, an exemplary system includes a general-purpose computing device 1400, including a processing unit (CPU or processor) 1420 and a system bus 1410 that couples various system components including the system memory 1430 such as read-only memory (ROM) 1440 and random access memory (RAM) 1450 to the processor 1420. The system 1400 can include a cache of high-speed memory connected directly with, in close proximity to, or integrated as part of the processor 1420. The system 1400 copies data from the memory 1430 and/or the storage device 1460 to the cache for quick access by the processor 1420. In this way, the cache provides a performance boost that avoids processor 1420 delays while waiting for data. These and other modules can control or be configured to control the processor 1420 to perform various actions. Other system memory 1430 may be available for use as well. The memory 1430 can include multiple different types of memory with different performance characteristics. It can be appreciated that the disclosure may operate on a computing device 1400 with more than one processor 1420 or on a group or cluster of computing devices networked together to provide greater processing capability. The processor 1420 can include any general purpose processor and a hardware module or software module, such as module 1 1462, module 2 1464, and module 3 1466 stored in storage device 1460, configured to control the processor 1420 as well as a special-purpose processor where software instructions are incorporated into the actual processor design. The processor 1420 may essentially be a completely self-contained computing system, containing multiple cores or processors, a bus, memory controller, cache, etc. A multi-core processor may be symmetric or asymmetric.

The system bus 1410 may be any of several types of bus structures including a memory bus or memory controller, a peripheral bus, and a local bus using any of a variety of bus architectures. A basic input/output (BIOS) stored in ROM 1440 or the like, may provide the basic routine that helps to transfer information between elements within the computing device 1400, such as during start-up. The computing device 1400 further includes storage devices 1460 such as a hard disk drive, a magnetic disk drive, an optical disk drive, tape drive or the like. The storage device 1460 can include software modules 1462, 1464, 1466 for controlling the processor 1420. Other hardware or software modules are contemplated. The storage device 1460 is connected to the system bus 1410 by a drive interface. The drives and the associated computer-readable storage media provide non-volatile storage of computer-readable instructions, data structures, program modules and other data for the computing device 1400. In one aspect, a hardware module that performs a particular function includes the software component stored in a tangible computer-readable storage medium in connection with the necessary hardware components, such as the processor 1420, bus 1410, display 1470, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 1400 is a small, handheld computing device, a desktop computer, or a computer server.

Although the exemplary embodiment described herein employs the hard disk 1460, other types of computer-readable media which can store data that are accessible by a computer, such as magnetic cassettes, flash memory cards, digital versatile disks, cartridges, random access memories (RAMs) 1450, and read-only memory (ROM) 1440, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 1400, an input device 1490 represents any number of input mechanisms, such as a microphone for speech, a touch-sensitive screen for gesture or graphical input, keyboard, mouse, motion input, speech and so forth. An output device 1470 can also be one or more of a number of output mechanisms known to those of skill in the art. In some instances, multimodal systems enable a user to provide multiple types of input to communicate with the computing device 1400. The communications interface 1480 generally governs and manages the user input and system output. There is no restriction on operating on any particular hardware arrangement and therefore the basic features here may easily be substituted for improved hardware or firmware arrangements as they are developed.

Use of language such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," are intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

The invention claimed is:

1. A method comprising:
receiving, at a computer system, a plurality of comments associated with an event, wherein each comment in the plurality of comments is received while the event is ongoing;
training, via at least one processor of the computer system, an artificial intelligence algorithm using commentary on a topic;
executing, via the at least one processor, the artificial intelligence algorithm on the plurality of comments, resulting in at least one comment commonality;
calculating, via the at least one processor, at least one velocity at which the plurality of comments are being received;
calculating, via the at least one processor, at least one volatility of the plurality of comments;
generating, via the at least one processor, a conversation space where additional comments regarding the event can be represented, the conversation space allocated storage space in computer-readable memory,
wherein the conversation space is generated based on attributes of the plurality of comments comprising: the at least one comment commonality, the at least one velocity, and the at least one volatility; and
presenting the conversation space to at least one user while the event is ongoing.

2. The method of claim 1, wherein the event is a video event.

3. The method of claim 1, wherein the at least one comment commonality comprises a topic about the event.

4. The method of claim 1, wherein each comment in the plurality of comments comprises metadata, the metadata comprising a time of creation.

5. The method of claim 1, further comprising:
executing, via the at least one processor, a sentiment analysis on the plurality of comments, resulting in sentiment analysis results, wherein the volatility is measured, at least in part, on a distribution of sentiment within the plurality of comments.

6. The method of claim 1, further comprising:
receiving at least one existing taxonomy;
executing, via the at least one processor, at least one additional machine learning algorithm, wherein input to the at least one additional machine learning algorithm comprises the plurality of comments and the at least one existing taxonomy, and output of the at least one additional machine learning algorithm comprises a taxonomy,
wherein the generating of the conversation space is further based on the taxonomy.

7. The method of claim 1, wherein the conversation space is formed to the at least one user based upon at least one agreement between users.

8. A system comprising:
at least one processor; and
a non-transitory computer-readable storage medium having instructions stored which, when executed by the at least one processor, cause the at least one processor to perform operations comprising:
receiving a plurality of comments associated with an event, wherein each comment in the plurality of comments is received while the event is ongoing;
training an artificial intelligence algorithm using commentary on a topic;
executing the artificial intelligence algorithm on the plurality of comments, resulting in at least one comment commonality;
calculating at least one velocity at which the plurality of comments are being received;
calculating at least one volatility of the plurality of comments;
generating a conversation space where additional comments regarding the event can be viewed, the conversation space allocated storage space in computer-readable memory,
wherein the conversation space is generated based on attributes of the plurality of comments comprising: the at least one comment commonality, the at least one velocity, and the at least one volatility; and
presenting the conversation space to at least one user while the event is ongoing.

9. The system of claim 8, wherein the event is a video event.

10. The system of claim 8, wherein the at least one comment commonality comprises a topic about the event.

11. The system of claim 8, wherein each comment in the plurality of comments comprises metadata, the metadata comprising a time of creation.

12. The system of claim 8, the non-transitory computer-readable storage medium having additional instructions stored which, when executed by the at least one processor, cause the at least one processor to perform operations comprising:
executing a sentiment analysis on the plurality of comments, resulting in sentiment analysis results,
wherein the volatility is measured, at least in part, on a distribution of sentiment within the plurality of comments.

13. The system of claim 8, the non-transitory computer-readable storage medium having additional instructions stored which, when executed by the at least one processor, cause the at least one processor to perform operations comprising:

receiving at least one existing taxonomy;

executing at least one additional machine learning algo-
rithm, wherein input to the at least one additional
machine learning algorithm comprises the plurality of
comments and the at least one existing taxonomy, and
output of the at least one additional machine learning
algorithm comprises a taxonomy, wherein the generating of the conversation space is fur-
ther based on the taxonomy.

14. The system of claim 8, wherein the conversation space
is formed to the at least one user based upon at least one
agreement between users.

15. A non-transitory computer-readable storage medium
having instructions stored which, when executed by at least
one processor, cause the at least one processor to perform
operations comprising:

receiving a plurality of comments associated with an
event, wherein each comment in the plurality of com-
ments is received while the event is ongoing;

training an artificial intelligence algorithm using com-
mentary on a topic;

executing the artificial intelligence algorithm on the plu-
rality of comments, resulting in at least one comment
commonality;

calculating at least one velocity at which the plurality of
comments are being received;

calculating at least one volatility of the plurality of
comments;

generating a conversation space where additional com-
ments regarding the event can be viewed, the conver-
sation space allocated storage space in computer-read-
able memory, wherein the conversation space is generated based on
attributes of the plurality of comments comprising: the at least one comment commonality, the at least one
velocity, and the at least one volatility; and presenting the conversation space to at least one user
while the event is ongoing.

16. The non-transitory computer-readable storage
medium of claim 15, wherein the event is a video event.

17. The non-transitory computer-readable storage
medium of claim 15, wherein the at least one comment
commonality comprises a topic about the event.

18. The non-transitory computer-readable storage
medium of claim 15, wherein each comment in the plurality
of comments comprises metadata, the metadata comprising
a time of creation.

19. The non-transitory computer-readable storage
medium of claim 15, having additional instructions stored
which, when executed by the at least one processor, cause
the at least one processor to perform operations comprising:

executing a sentiment analysis on the plurality of com-
ments, resulting in sentiment analysis results, wherein the volatility is measured, at least in part, on a
distribution of sentiment within the plurality of com-
ments.

20. The non-transitory computer-readable storage
medium of claim 15, having additional instructions stored
which, when executed by the at least one processor, cause
the at least one processor to perform operations comprising:

receiving at least one existing taxonomy;

executing at least one machine learning algorithm,
wherein input to the at least one machine learning
algorithm comprises the plurality of comments and the
at least one existing taxonomy, and output of the at least
one machine learning algorithm comprises a taxonomy, wherein the generating of the conversation space is further
based on the taxonomy.

* * * * *